United States Patent
Matsumoto et al.

(10) Patent No.: US 6,877,973 B2
(45) Date of Patent: *Apr. 12, 2005

(54) METHOD AND APPARATUS FOR MANUFACTURING A LENS SHEET

(75) Inventors: Kazuyuki Matsumoto, Tokyo-to (JP); Hitomu Watanabe, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 428 days.

This patent is subject to a terminal disclaimer.

(21) Appl. No.: 10/001,145

(22) Filed: Oct. 24, 2001

(65) Prior Publication Data

US 2002/0056930 A1 May 16, 2002

(30) Foreign Application Priority Data

Nov. 10, 2000 (JP) .................................. P2000-343536
Sep. 10, 2001 (JP) .................................. P2001-273603

(51) Int. Cl.$^7$ .............................................. B29D 11/00
(52) U.S. Cl. .................... 425/111; 425/127; 425/128; 425/174.4; 425/DIG. 108; 425/808; 264/1.34; 156/379.6; 156/538
(58) Field of Search ................... 425/111, 127, 425/128, 174.4, 208, 209, 363, 447, DIG. 108, 808; 264/1.32, 1.34, 1.36, 2.4; 156/379.6, 538

(56) References Cited

U.S. PATENT DOCUMENTS 5,769,618 A * 6/1998 Ono et al. ................... 418/48
5,985,084 A * 11/1999 Summersgill et al. ... 156/273.7
2002/0056929 A1 * 5/2002 Matsumoto ............... 264/1.32
2002/0062915 A1 * 5/2002 Matsumoto et al. ...... 156/245

FOREIGN PATENT DOCUMENTS

| JP | 64007001 | 1/1989 |
| JP | 64086102 | 3/1989 |
| JP | 6067002 | 3/1994 |
| JP | 7148751 | 6/1995 |

OTHER PUBLICATIONS

Computer translation of JP 07-148751.*

* cited by examiner

Primary Examiner—James P. Mackey
Assistant Examiner—Donald Heckenberg
(74) Attorney, Agent, or Firm—Ladas & Parry LLP

(57) ABSTRACT

An apparatus for manufacturing a lens sheet comprises an application device, a substrate supply device, a pressing device and an irradiation device. The application device applies ionizing radiation curing type resin in the form of liquid on the upper surface of a forming die for a lens sheet to form an uncured resin body on the upper surface of the forming die. The substrate supply device places a substrate on the uncured resin body. The pressing device presses the substrate against the uncured resin body to flatten the uncured resin body, so as to form a uncured resin layer, while spreading the uncured resin body to an outside periphery of the forming die. The irradiation device irradiates ionizing radiation on the uncured resin layer through the substrate to cure the uncured resin layer.

4 Claims, 25 Drawing Sheets

METHOD AND APPARATUS FOR MANUFACTURING A LENS SHEET

BACKGROUND OF THE INVENTION

1. Field of the Invention

The present invention relates a method and an apparatus for manufacturing lens sheets such as Fresnel lens sheets.

2. Description of the Related Art

Japanese Laid-Open Patent Application Nos. S64-7001, S64-86102, H6-67002 and H7-148751 disclose a method for manufacturing various kinds of lens sheet such as Fresnel lens sheets, lenticular lens sheets or the like, which are to be used for a transmission type screen for a projection TV.

According to the manufacturing method, which is disclosed in Japanese Laid-Open Patent Application No. S64-7001, a lens sheet is manufactured by carrying out the following steps. First, ultraviolet ray curing type resin in the form of liquid is applied on the entirety of the upper surface of a forming die for Fresnel lens to form an uncured resin layer. Then, the ultraviolet ray curing type resin in the form of liquid is applied on the central portion of the uncured resin layer to form an uncured resin pool. Then, a sheet-shaped substrate is placed on the uncured resin pool. A surface plate is then placed on the substrate to press the uncured resin pool and the uncured resin layer together with the substrate against the forming die. Ultraviolet ray is irradiated on the ultraviolet ray curing type resin through the surface plate and the substrate to cure it. Then, the cured resin is peeled together with the substrate from the forming die, thus manufacturing a lens sheet.

According to the manufacturing method, which is disclosed in Japanese Laid-Open Patent Application No. S64-86102, a lens sheet is manufactured by carrying out the following steps. First, ultraviolet ray curing type resin in the form of liquid is applied on the entirety of the upper surface of a forming die to form an uncured resin layer. Then, the ultraviolet ray curing type resin in the form of liquid is applied on one side of the uncured resin layer to form an uncured resin pool. Then, a sheet-shaped substrate is placed on the uncured resin pool. The uncured resin pool and the uncured resin layer are pressed together with the substrate against the forming die by means of a pressing roller from the above-mentioned one side of the uncured resin layer toward the other side thereof so as to obtain a laminate structure of the substrate and the ultraviolet ray curing type resin, while excluding bubbles from the ultraviolet ray curing type resin. Then, ultraviolet ray is irradiated on the ultraviolet ray curing type resin through the substrate to cure it. Then, the cured resin is peeled together with the substrate from the forming die, thus manufacturing a lens sheet.

According to the manufacturing method, which is disclosed in Japanese Laid-Open Patent Application No. H6-67002, a lens sheet is manufactured by carrying out the following steps. First, ultraviolet ray curing type resin in the form of liquid is applied on the entirety of the upper surface of a forming die to form an uncured resin layer. Ultraviolet ray is irradiated on the uncured resin layer to cure it. The ultraviolet ray curing type resin is applied on one side of the cured resin layer to form an uncured resin pool. Then, the uncured resin pool is spread through a sheet-shaped substrate into a uncured resin layer by means of a pressing roller so as to obtain a laminate structure of the substrate, the cured resin layer and the uncured resin layer, while excluding bubbles from the ultraviolet ray curing type resin. Then, the ultraviolet ray is irradiated on the uncured resin layer through the substrate to cure it. Then, the cured resin is peeled together with the substrate from the forming die, thus manufacturing a lens sheet.

According to the manufacturing method, which is disclosed in Japanese Laid-Open Patent Application No. H7-148751, a lens sheet is manufactured by carrying out the following steps. First, ultraviolet ray curing type resin in the form of liquid is applied on the entirety of the upper surface of a forming die to form an uncured resin layer. Solvent contained in the ultraviolet ray curing type resin is vaporized by a hot-air dryer to form a solvent-vaporized layer. Then, the ultraviolet ray curing type resin is applied on one side of the solvent-vaporized layer to form an uncured resin pool. Then, the uncured resin pool is spread through a sheet-shaped substrate into a uncured resin layer by means of a pressing roller so as to obtain a laminate structure of the substrate, the solvent-vaporized layer and the uncured resin layer, while excluding bubbles from the ultraviolet ray curing type resin. Then, the ultraviolet ray is irradiated on the uncured resin layer through the substrate to cure it. Then, the cured resin is peeled together with the substrate from the forming die, thus manufacturing a lens sheet.

However, the above-mentioned prior art has a problem that a relatively large amount of bubbles is entrapped in the ionizing radiation curing type resin such as the ultraviolet ray curing type resin, which is applied on the forming die.

SUMMARY OF THE INVENTION

An object of the present invention is therefore to provide a method and an apparatus for manufacturing a lens sheet, which permits to reduce an amount of bubbles, which are entrapped in ionizing radiation curing type resin applied on the forming die, in comparison with the conventional method and apparatus.

Another object of the present invention is to provide a method and an apparatus for manufacturing a lens sheet, which permits to simplify a series of manufacturing steps, reduce the size of the apparatus, improve capacity factor of the forming dies and reduce molding cycle.

In order to attain the aforementioned object, the method of the first aspect of the present invention for manufacturing a lens sheet comprises:

a resin-application step for applying ionizing radiation curing type resin in a form of liquid on an upper surface of a forming die to form an uncured resin body on the upper surface of said forming die;

a laminating step for placing a substrate on said uncured resin body and then pressing said substrate against said uncured resin body to flatten said uncured resin body, thereby forming a uncured resin layer, while spreading said uncured resin body to an outside periphery of said forming die;

a curing step for irradiating ionizing radiation on said uncured resin layer through said substrate to cure said uncured resin layer, thereby forming a cured resin layer; and a removing step for removing said cured resin layer together with said substrate from said forming die.

According to the above-mentioned features of the first aspect of the present invention, the ionizing radiation curing type resin, which is applied by the resin-application step is pressed and flattened through the substrate so that a superfluous amount of the ionizing radiation curing type resin flows from the periphery of a die body of the forming die. It is therefore possible to prevent bubbles from being entrapped between the substrate and the forming die.

In the second aspect of the present invention, said resin-application step may comprise a partial-surface application step for applying the ionizing radiation curing type resin on at least one part of the upper surface of the forming die to form a uncured resin pool thereon. According to such a feature, the uncured resin pool of the ionizing radiation curing type resin is flattened on the forming die so that the ionizing radiation curing type resin flows on the forming die, while excluding air from forming grooves of the forming die. It is therefore possible to prevent air from being entrapped into a lens sheet.

In the third aspect of the present invention, said resin-application step may comprise a full-surface application step for applying the ionizing radiation curing type resin on an entirety of the upper surface of said forming die to form a first uncured resin layer and a partial-surface application step for applying the ionizing radiation curing type resin on at least one part of said first uncured resin layer to form an uncured resin pool thereon. According to such a feature, the uncured resin pool of the ionizing radiation curing type resin as applied is flattened, while excluding air from the ionizing radiation curing type resin. It is therefore possible to supplement an insufficient amount of ionizing radiation curing type resin as first applied, while preventing air from being entrapped between the substrate and the forming die.

In the fourth aspect of the present invention, the pressing of said laminating step may comprise continuously pressing said substrate from said one side of the forming die to an other side thereof, said one side of the forming die serving as a pressing-starting side. According to such a feature, the ionizing radiation curing type resin is flattened, while pressing the substrate from the one side of the forming die to the other side thereof. It is therefore possible to place the substrate on the ionizing radiation curing type resin to provide a laminate structure, while excluding air from a space between the substrate and the forming die in one direction.

In the fifth aspect of the present invention, the pressing of said laminating step may comprise continuously pressing said substrate from a central portion of the forming die, said central portion of the forming die serving as a pressing-starting side. According to such a feature, the ionizing radiation curing type resin is flattened, while the substrate is pressed from the central portion of the forming die toward the periphery thereof. It is therefore possible to place the substrate on the ionizing radiation curing type resin to provide a laminate structure, while radially excluding air from a space between the substrate and the forming die. As a result, it is possible to exclude air in an appropriate manner upon manufacture of a lens sheet such as Fresnel lens having concentric circular grooves.

In the sixth aspect of the present invention, said partial application step may comprise applying the ionizing radiation curing type resin on said pressing-starting side. According to such a feature, the ionizing radiation curing type resin is pressed and flattened from the pressing-starting side toward the other side, i.e., a pressing-finishing side. It is therefore possible to effectively prevent bubbles from being entrapped between the substrate and the forming die.

In the seventh aspect of the present invention, the pressing of said laminating step may be carried out using a pressing roller. According to such a feature, the substrate is pressed by means of the pressing roller. It is therefore possible to gradually flatten the ionizing radiation curing type resin and exclude air from a space between the substrate and the forming die in an appropriate manner.

In the eighth aspect of the present invention, the pressing of said laminating step may be carried out using a surface plate. According to such a feature, the substrate is pressed by a flat surface of the surface plate. It is therefore possible to provide a uniform thickness of the ionizing radiation curing type resin layer, thus improving flatness of a lens sheet as manufactured.

In the ninth aspect of the present invention, the method may further comprise a die-temperature adjusting step for adjusting temperature of the forming die to a prescribed temperature, which is suitable to formation of a lens sheet, said die-temperature adjusting step being followed by said resin-application step. According to such a feature, the temperature of the forming die is adjusted to the prescribed temperature, which is suitable to formation of the lens sheet. It is therefore possible to ensure a smooth flow of the ionizing radiation curing type resin when flattening it so as to prevent properly bubbles from being entrapped into the resin. Adhesiveness of the ionizing radiation curing type resin to the substrate can also be improved.

In the tenth aspect of the present invention, said resin-application step, said laminating step, said curing step and said removing step may be carried out on a traveling passage of an endless conveying device for conveying the forming die, and said die-temperature adjusting step may be carried out on a returning passage of said endless conveying device. According to such a feature, it is possible to manufacture a lens sheet, while circulating the forming dies on the endless conveying device. In addition, the temperature of the forming die can be adjusted before it is returned to the starting position of the traveling passage. Consequently, manufacture of a lens sheet can be conducted without specifically providing any period of time for carrying out a die-temperature adjusting step.

In the eleventh aspect of the present invention, the method may further comprise a resin-temperature adjusting step for adjusting temperature of the ionizing radiation curing type resin to a prescribed temperature, which is suitable to formation of a lens sheet, said resin-temperature adjusting step being followed by said resin-application step. According to such a feature, it is possible to apply the ionizing radiation curing type resin having an appropriate temperature on the forming die. It is therefore possible to ensure a smooth flow of the ionizing radiation curing type resin on the forming die so as to prevent bubbles from being entrapped into the resin and improve formability of the lens sheet. In case where the temperature of the forming die is previously adjusted by the die-temperature adjusting step, it is possible to ensure a smoother flow of the ionizing radiation curing type resin on the forming die, thus preventing more effectively air from being entrapped into the resin. Adhesiveness of the ionizing radiation curing type resin to the substrate can also be improved.

In order to attain the aforementioned object, the apparatus of the twelfth aspect of the present invention for manufacturing a lens sheet comprises:

an application device for applying ionizing radiation curing type resin in a form of liquid on an upper surface of a forming die for a lens sheet to form an uncured resin body on the upper surface of said forming die;

a substrate supply device for placing a substrate on said uncured resin body;

a pressing device for pressing said substrate against said uncured resin body to flatten said uncured resin body, so as to form a uncured resin layer, while spreading said uncured resin body to an outside periphery of said forming die; and an irradiation device for irradiating ionizing radiation on said uncured resin layer through said substrate to cure said uncured resin layer.

According to the above-mentioned features of the twelfth aspect of the present invention, the ionizing radiation curing type resin, which is applied by the resin-application device is pressed and flattened through the substrate, which is supplied by means of the substrate supply device so that a superfluous amount of the ionizing radiation curing type resin flows from the periphery of a die body of the forming die. It is therefore possible to prevent bubbles from being entrapped between the substrate and the forming die.

In the thirteenth aspect of the present invention, the apparatus may further comprise a die-temperature adjusting device for adjusting temperature of the forming die to a prescribed temperature, which is suitable to formation of a lens sheet. According to such a feature, the temperature of the forming die is adjusted to the prescribed temperature, which is suitable to formation of the lens sheet, by means of the die-temperature adjusting device. It is therefore possible to ensure a smooth flow of the ionizing radiation curing type resin so as to prevent properly bubbles from being entrapped into the resin. Adhesiveness of the ionizing radiation curing type resin to the substrate can also be improved.

In the fourteenth aspect of the present invention, said application device, said substrate supply device, said pressing device and said irradiation device may be disposed along a traveling passage of an endless conveying device for conveying the forming die, and said die-temperature adjusting device may be disposed along a returning passage of said endless conveying device. According to such a feature, it is possible to manufacture a lens sheet, while circulating the forming dies on the endless conveying device. In addition, the die-temperature adjusting device is disposed on the returning passage of the endless conveying device so that the temperature of the forming die can be adjusted before it is returned to the starting position of the traveling passage. Consequently, temperature adjustment of the forming die can be carried out utilizing a non-service period of time for the forming die. It is also possible to prevent the length of the conveying device from increasing.

In the fifteenth aspect of the present invention, the apparatus may further comprise a circulation device for circulating, when application of the ionizing radiation curing type resin by said application device is temporarily stopped, the ionizing radiation curing type resin, which is to be applied, while adjusting temperature thereof. According to such a feature, the ionizing radiation curing type resin, which has been subjected to the temperature adjusting step, is circulated. It is therefore possible to apply the ionizing radiation curing type resin, which always has an appropriate temperature, on the forming die by means of the application device, thus providing a smooth application of the ionizing radiation curing type resin on the forming die.

In the sixteenth aspect of the present invention, the apparatus may further comprise a displacement type-single eccentric shaft screw pump for supplying the ionizing radiation curing type resin to said application device. According to such a feature, the ionizing radiation curing type resin is supplied by means of the displacement type-single eccentric shaft screw pump. The pump supplies the ionizing radiation curing type resin to the application device without imparting shearing force to the ionizing radiation curing type resin. It is therefore possible to apply the ionizing radiation curing type resin onto the forming die without deterioration of the resin.

In the present invention, the "forming die" means a device for forming or molding a lens sheet and includes a forming mold.

DETAILED DESCRIPTION OF THE PREFERRED EMBODIMENTS

Figure 1A:
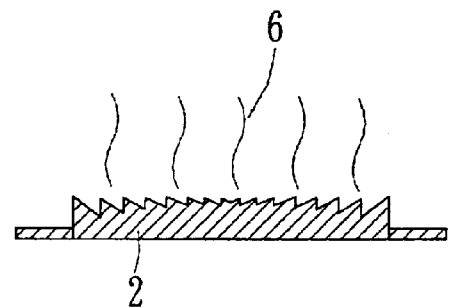
FIGS. 1(A) to 1(G) are descriptive views illustrating steps in sequence of a lens sheet manufacturing method of the first embodiment of the present invention.
Figure 1B:
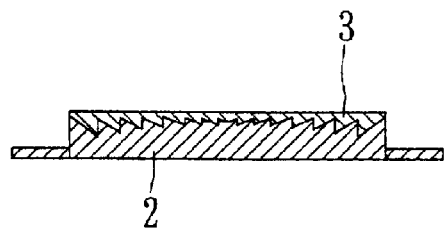
Figure 1C:
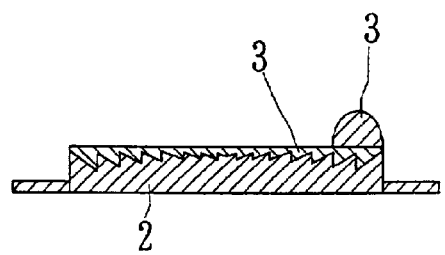
Figure 1D:
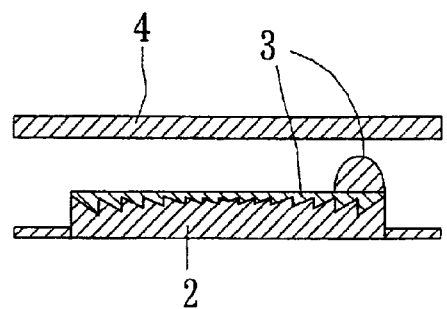
Figure 1E:
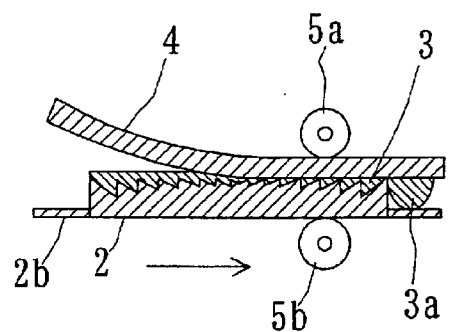
Figure 1F:
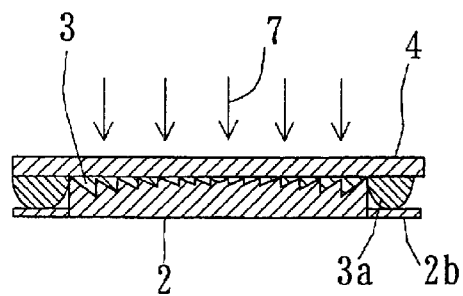
Figure 1G:
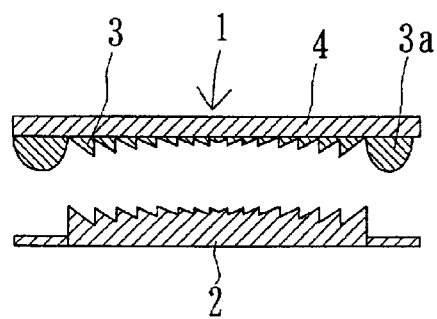

Now, embodiments of the present invention will be described in detail below with reference to the accompanying drawings.

First Embodiment

A lens sheet is manufactured in accordance with a manufacturing method as shown in FIG. 1. The lens sheet 1 is a Fresnel lens sheet. The method of the present invention may be applied not only to the manufacture of the Fresnel lens sheet, but also to the manufacture of a lenticular lens sheet or the like.

As shown in FIGS. 1(A) to 1(G), the lens sheet 1 is manufactured by carrying out a temperature adjusting step (A) for make adjustment of temperature of a forming die 2 for the lens sheet 1 to a prescribed temperature, which is suitable to formation of the lens sheet 1; the first resin-application step (i.e., the full-surface application step) (B) for applying ionizing radiation curing type resin 3 in the form of liquid on the entirety of the upper surface of the forming die 2, to which the above-mentioned temperature adjusting step (A) has been applied, to form the first uncured resin layer; the second resin-application step (i.e., the partial-surface application step) (C) for applying the ionizing radiation curing type resin 3 in the form of liquid on one side, i.e., a pressing-starting side of the first uncured layer, which has been applied on the forming die 2, to form an uncured resin pool; a substrate supplying step (D) for placing a substrate 4, through which ionizing radiation permeates, on the first uncured resin layer and the uncured resin pool from above the forming die 2; a laminating step (E) for pressing the substrate 4 and the forming die 2 from the pressing-starting side toward the pressing-finishing side by means of a pair of pressing rollers 5a, 5b to spread the uncured resin pool over the first uncured resin layer and flatten it so that an superfluous amount of resin 3 reaches the periphery of a die body of the forming die 2, thereby forming the second uncured resin layer on the first uncured resin layer so as to provide a laminate structure of the first and second uncured resin layers and the substrate 4; a resin-curing step (F) for irradiating ionizing radiation onto the first and second uncured resin layers through the substrate 4 to cure them; and a removing step (G) for removing the ionizing radiation curing type resin 3 as cured from the forming die 2 together with the substrate 4.

Figure 4:
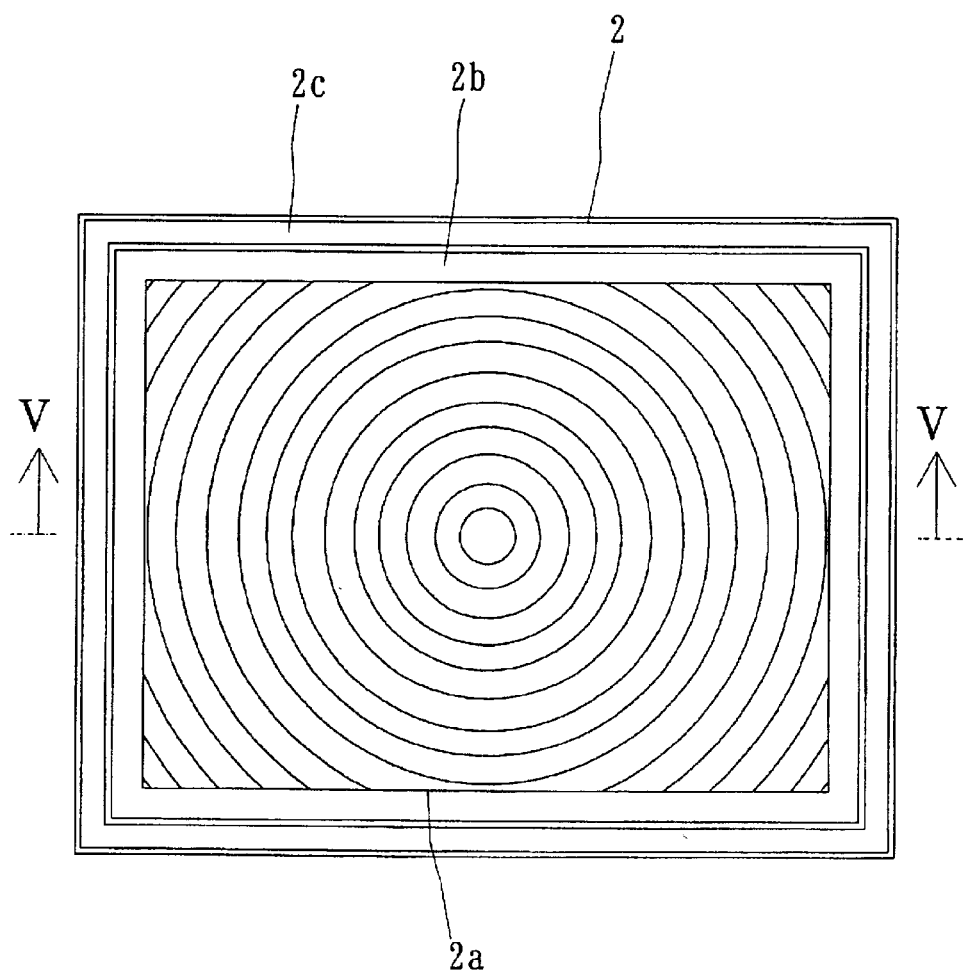
FIG. 4 is a plan view of the forming die.
Figure 5:
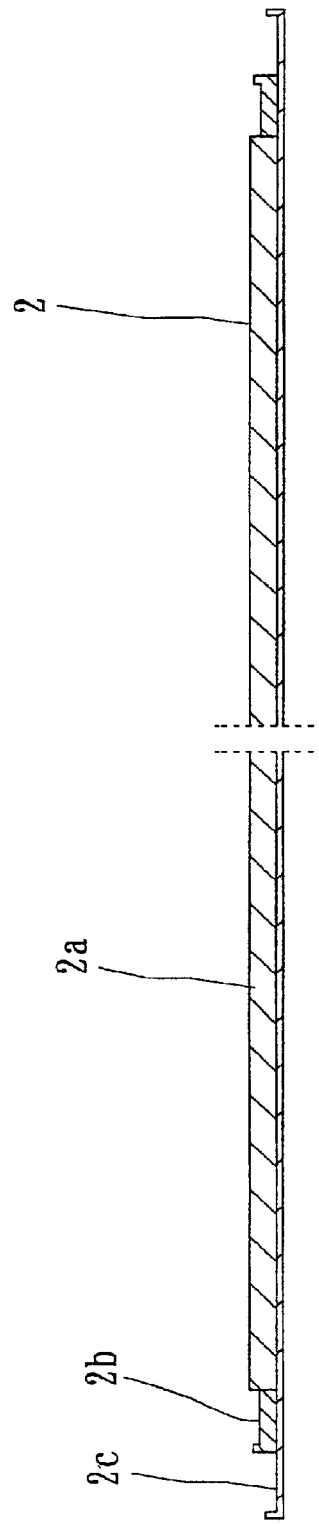
FIG. 5 is a cross-sectional view cut along the line V—V in FIG. 4.

The forming die 2 used in the method of the present invention has a die body 2a, a receiving member 2b surrounding the periphery of the die body 2a and a base plate 2c having a disc-shape so as to surround the receiving member 2b, as shown in FIGS. 4 and 5. The receiving member 2b and the base plate 2c may be omitted, as an occasion demands. The die body 2a, which is a metallic die formed by for example an electrocasting method, has on its upper surface a lens formation surface on which ionizing radiation curing type resin is to be applied. A cutting die, an electrocasting die, a resin die or the like may be used as the die body 2a. The receiving member 2b, which projects outside from the four peripheral sides of the die body 2a, receives the superfluous amount of ionizing radiation curing type resin 3a overflowed from the die body 2. The base plate 2c supports the die body 2a and the receiving member from below thereof.

The temperature-adjusting step (A) is to heat uniformly the forming die 2 to a temperature, which is suitable to formation of the lens sheet. The step (A) is carried out for example by blowing hot air 6 heated by an electric heater, dried vapor or the like on the forming die 2 in a prescribed period of time. The blowing step of the hot air 6 may be applied uniformly to the entirety of the forming die 2, or in a manner that a flow rate of the hot air 6 is increased for a local portion, which is apt to be cooled. The flow rate of the hot air 6 can be adjusted by changing opening areas of a plurality of nozzles, while blowing the hot air 6 from these nozzles, or regulating an opening of a damper, which is provided on the upstream side of the nozzle. The temperature adjustment of the forming die 2 can also be made with the use of a temperature adjustment device disposed on the forming die 2.

In case where the ionizing radiation curing type resin 3 applied in accordance with the first resin-application step (B) and the second resin-application step (C) contains solvent, the above-described temperature-adjusting step (A) has functions not only of heating the forming die 2, but also of removing the solvent. Removal of the solvent from the ionizing radiation curing type resin 3 prevents bubbles from being entrapped in the lens. The forming die 2 may be heated excessively by ionizing radiation 7, which is irradiated in accordance with the resin-curing step (F). In such a case, the temperature adjusting step (A) makes it possible to cool the forming die 7 excessively heated to an optimum temperature.

The first resin-application step (i.e., the full-surface application step) (B) is to apply the ionizing radiation curing type resin 3 in the form of liquid on the entirety of the upper surface of the forming die 2, to which the temperature-adjusting step (A) has been applied, to form the first uncured layer. In such a step (B), the ionizing radiation curing type resin 3 is poured in the form of liquid on the forming die 2 for example through a single nozzle or a plurality of nozzles Application of the ionizing radiation curing type resin 3 in the form of liquid is conducted, while one or both of the forming die 2 and the nozzle is traveled. It is preferable to apply the ionizing radiation curing type liquid resin 3 on the forming die 2 from one side thereof to the other side thereof, while pouring the resin 3 in the form of threads from a plurality of nozzles each having a small discharging opening. This makes it possible to prevent air from being entrapped into lens formation grooves on a lens formation surface of the forming die 2. The forming die 2 has also been subjected to the temperature adjustment step to be heated uniformly. Accordingly, the ionizing radiation curing type liquid resin as applied rapidly extends over the lens formation grooves without entrapping bubbles.

Ultraviolet ray curing type resin, electron beam curing type resin or the like may be used as the ionizing radiation curing type liquid resin 3.

The second resin-application step (i.e., the partial-surface application step) (C) is to apply the ionizing radiation curing type liquid resin 3 on one side, i.e., the pressing-starting side of the first uncured layer, which has been applied on the forming die 2, to from an uncured resin pool on the pressing-starting side. The ionizing radiation curing type liquid resin is poured on the forming die 2 through the same single nozzle or plurality of nozzles as in the first resin-application step (B) or an ordinary single nozzle to form the uncured resin pool. The second resin-application step (C) may be omitted as an occasion demands.

The substrate supplying step (D) is to place a substrate 4 on the first uncured resin layer and the uncured resin pool of the ionizing radiation curing type resin 3 from above the forming die 2. For example, a plurality of suction cups disposed on a plane suck the substrate 4 having a sheet-shape and are moved to carry the substrate 4 on the forming die 2 on which the first uncured resin layer and the uncured resin pool of the ionizing radiation curing type resin 3 have been formed. The sucking action of the suction cups is released so that the substrate 4 drops on the first uncured resin layer and the uncured resin pool of the ionizing radiation curing type resin 3, thus adhering on the surface of the ionizing radiation curing type resin 3.

The substrate 4 is formed of a transparent thin sheet such as an acrylic resin sheet through which ionizing radiation such as ultraviolet ray or electron beam permeates.

The laminating step (E) is to press the substrate 4 against the first uncured resin layer and the uncured resin pool of the ionizing radiation curing type resin 3 on the forming die 2 from the pressing-starting side toward the pressing-finishing side. More specifically, the forming die 2 on which the first uncured resin layer and the uncured resin pool of the ionizing radiation curing type resin 3 have been formed and then the substrate 4 has been placed thereon, is passed between a pair of pressing rollers 5a, 5b to spread the uncured resin pool over the first uncured resin layer, so as to form the second uncured resin layer on the first uncured resin layer. As a result, the first uncured resin layer and the second uncured resin layer are combined into a united layer having a uniform thickness. The uncured resin pool of the ionizing radiation curing type resin 3 applied in accordance with the second resin-application step (C) is spread over the first uncured resin layer from the pressing-starting side toward the pressing-finishing side so as to press bubbles out of the ionizing radiation curing type resin 3, thus preventing bubbles from being entrapped between the substrate 4 and the forming die 2. Part of the ionizing radiation curing type resin 3 including bubbles is pushed away from the periphery of the die body 2a. Of the pair of pressing rollers 5a, 5b, the upper roller 5a, which comes into contact with the substrate 4, is provided with a crown. Such a crown causes the ionizing radiation curing type resin 3 to flow smoothly into the lens formation grooves, which are formed concentrically, without entrapping bubbles in these grooves. In addition, the forming die 2 is previously subjected to the temperature adjustment in-the laminating step (E). As a result, the ionizing radiation curing type resin 3 flows smoothly on the forming die 2, which is heated to an appropriate temperature, and comes securely in close contact with the substrate 4.

The resin-curing step (F) is to irradiate ionizing radiation onto the first and second uncured resin layers through the substrate 4 to cure them. More specifically, a radiation source such as an ultraviolet ray lamp is disposed above the forming die 2 to irradiate uniformly ionizing radiation 7 on the substrate 4. The ionizing radiation 7, which permeates through the substrate 4, acts on the ionizing radiation curing type resin 3 applied on the forming die to cure it. The ionizing radiation curing type resin 3 as cured adheres firmly to the substrate 4.

Figure 3:
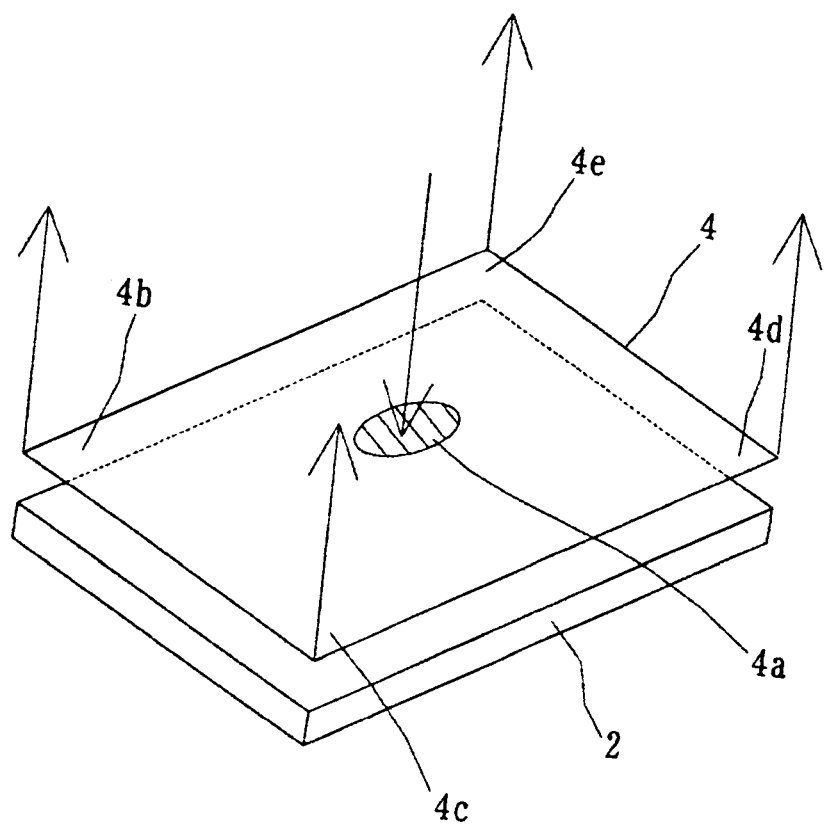
FIG. 3 is a perspective view illustrating a step for removing the lens sheet from a forming die.

The removing step (G) is to remove the ionizing radiation curing type resin 3 as cured thorough irradiation of the ionizing radiation 7 from the forming die 2 together with the substrate 4. More specifically, manual operations will be carried out as follows. First, the central portion of the substrate 4 is urged against the forming die 2 and the opposite portions 4b, 4d placed along a diagonal line of the lens sheet 1 are caught and lifted up as shown in FIG. 3. Accordingly, the ionizing radiation curing type resin 3 is peeled from the forming die 2 from the vicinities to the opposite portions 4b, 4d toward the central portion. Then, the opposite portions 4b, 4d placed along the diagonal line of the substrate 4 are moved down on the forming die 2. The other opposite portions 4c, 4e placed along the other diagonal line of the substrate 4 are caught and lifted up. Accordingly, the ionizing radiation curing type resin 3 is peeled from the forming die 2 from the vicinities to the other opposite portions 4c, 4e toward the central portion. Finally, all the two pairs of opposite portions 4b, 4c, 4d, 4e are caught and lifted up simultaneously so that the whole ionizing radiation curing type resin 3 is completely peeled from the forming die 2.

The removing step may be carried out as follows. First, a pair of opposite sides of the substrate 4 is simultaneously lifted up and the other pair of opposite sides of the substrate 4 is also simultaneously lifted up. Such a lifting-up operation is repeated several times to peel gradually the ionizing radiation curing type resin 3 from the periphery of the lens sheet toward the central portion thereof. Finally, the whole lens sheet 1 is lifted up above the forming die 2, while pushing the central portion 4a of the substrate 4 toward the forming die 2. The whole ionizing radiation curing type resin 3 is completely peeled from the forming die 2 together with the substrate 4.

Sharp irregularities exist on the bottom of the lens formation grooves or between the adjacent lens formation grooves on the Fresnel lens formation surface of the forming die 2, as shown in FIGS. 1(A) to 1(G). Operations of catching one side or corner of the substrate and peeling it toward the other side or corner may damage the irregularities of the Fresnel lens formed of the ionizing radiation curing type resin 3, thus degrading performance of the lens. The above-described removing step however makes it possible to prevent the irregularities of the Fresnel lens formed of the ionizing radiation curing type resin 3 from being damaged by the forming die 2.

Figure 2A:
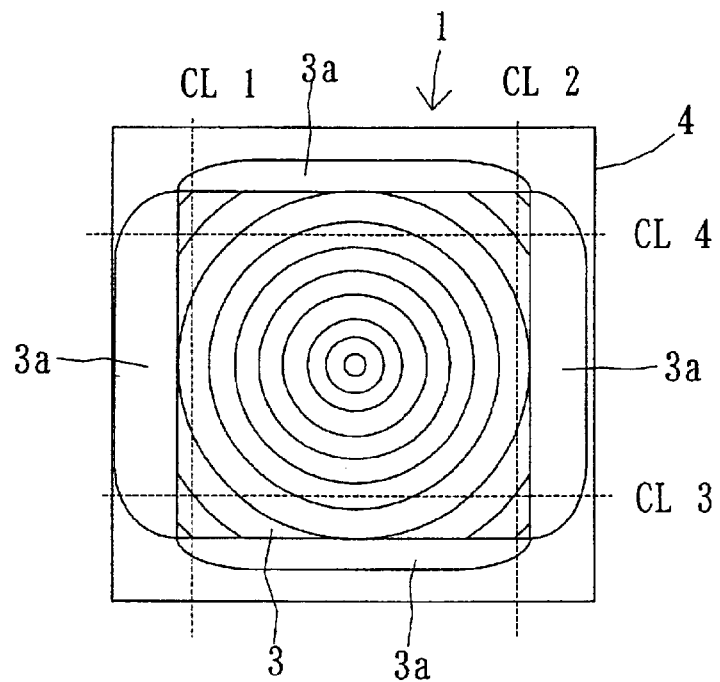
FIGS. 2(A) and 2(B) are plan views of a lens sheet manufactured by the lens sheet manufacturing method as shown in FIG. 1.
Figure 2B:
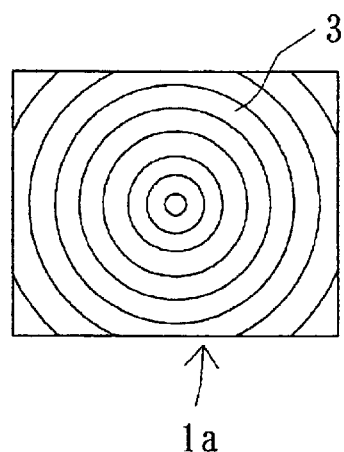

The Fresnel lens sheet 1 can be prepared by carrying out all of the steps (A) to (G). The substrate 4 of the Fresnel lens sheet 1 has a superfluous amount of ionizing radiation curing type resin 3, which has extended from the four sides of the forming die 2 to adhere on the substrate 4 and been cured, as shown in FIG. 2(A). Cutting operations of useless end portions having a superfluous amount of ionizing radiation curing type resin 3 are applied, as an occasion demands, to the Fresnel lens sheet 1 along cutting lines CL1, CL2, CL3 and CL4 as shown in FIG. 2(A) to remove the useless end portions, thus obtaining the Fresnel lens sheet 1a as the finished product.

In the above-described method for manufacturing the lens sheet, there may be adopted a structure in which (i) the forming dies 2 are conveyed on an endless conveying device, (ii) the resin-application step, the laminating step, the curing step and the removing step are carried out on a traveling passage of the endless conveying device and (iii) the die-temperature adjusting step is carried out on a returning passage of the endless conveying device. Such an arrangement of the devices for carrying out these steps makes it possible to effectively manufacture the lens sheet 1, while circulating the forming dies 2 on the endless conveying device. In addition, the temperature of the forming die 2 can be adjusted before it is returned to the starting position of the traveling passage. Consequently, manufacture of the lens sheet 1 can be conducted without specifically providing any period of time for carrying out the die-temperature adjusting step.

Now, description will be given below of a manufacturing apparatus, which is applied to carry out the method for manufacturing the above-mentioned lens sheet.

Figure 6:
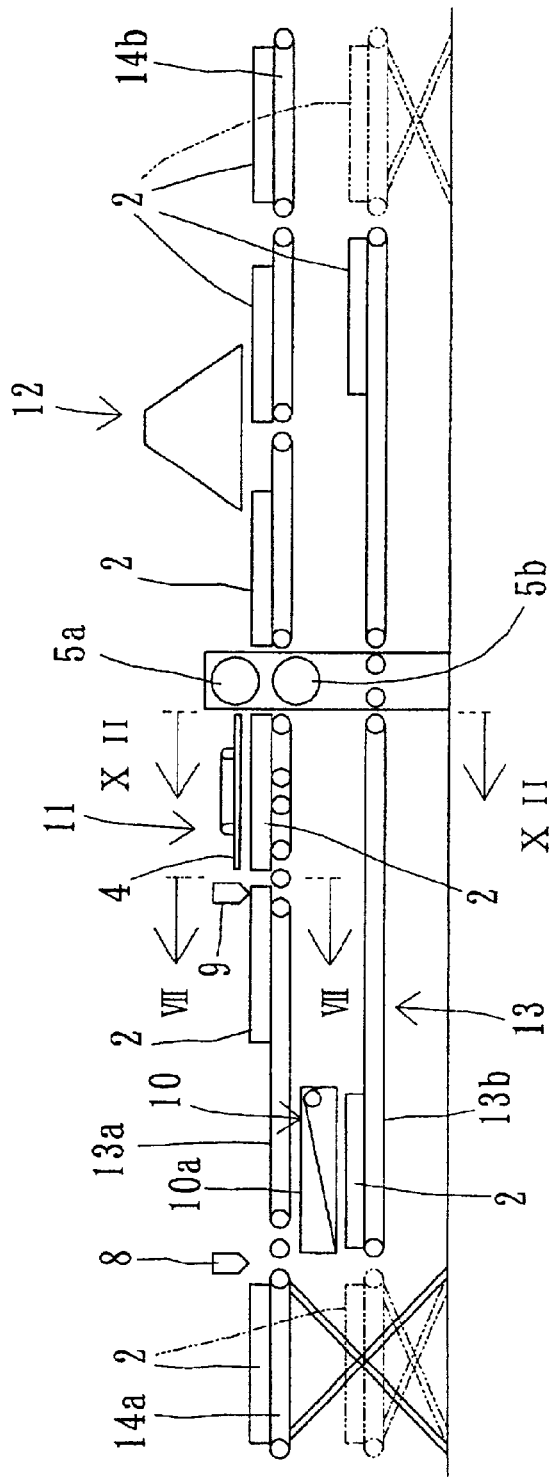
FIG. 6 is an elevation view illustrating a lens sheet manufacturing apparatus.

The apparatus for manufacturing a lens sheet includes, as shown in FIG. 6, a die-temperature adjusting device 10, the first nozzle 8 serving as the first application device, the second nozzle 9 serving as the second application device, a substrate supply device 11, a pair of pressing rollers 5a, 5b and an ionizing radiation irradiating device 12. The temperature-adjusting device 10 adjusts temperature of the forming die 2 for the lens sheet 1 to a suitable temperature for formation of the lens sheet. The first nozzle 8 is used to apply the ionizing radiation curing type resin in the form of liquid on the entirety of the upper surface of the forming die 2, the temperature of which has already been adjusted, to form the first uncured resin layer thereon. The second nozzle 9 is used to apply the ionizing radiation curing type resin in the form of liquid on a pressing-starting side of the first uncured layer to form an uncured resin pool. The substrate supply device 11 places the substrate 4, through which ionizing radiation 7 permeates, on the first uncured resin layer and the uncured resin pool from above the forming die 2. The pair of pressing rollers 5a, 5b presses the substrate 4 and the forming die 2 from the pressing-starting side toward the pressing-finishing side to spread the uncured resin pool over the first uncured resin layer, thereby forming the second uncured resin layer on the first uncured resin layer. The ionizing radiation irradiating device 12 irradiates ionizing radiation 7 onto the first and second uncured resin layers of the ionizing radiation curing type resin 3 through the substrate 4 to cure them.

The apparatus for manufacturing a lens sheet has a conveying device 13 by which a plurality of forming dies 2 can be circulated therein. The conveying device 13 is provided on its upper side with a traveling passage 13a for the forming dies 2 and on its lower side with a returning passage 13b for them. The traveling passage 13a and the returning passage 13b are composed of a roller conveyer, a chain conveyer or the like. The conveying device 13 is provided on its opposite ends with lifters 14a, 14b. One lifter 14a has a function of moving the forming die 2, which has been returned on the returning passage 13b, upward to the traveling passage 13a. The other lifter 14b has a function of moving the forming die 2, which has been conveyed on the traveling passage 13a, downward to the returning passage 13b. The first and second nozzles 8, 9, the substrate supply device 11, the pressing rollers 5a, 5b and the ionizing radiation irradiating device 12 are disposed along the traveling passage 13a of the conveying device 13. The temperature-adjusting device 10 is disposed along the returning passage 13b of the conveying device 13. Each of the traveling passage 13a and the returning passage 13b of the conveying device 13 is divided into a plurality of endless conveying units, which can independently be driven at the respective independent speed or stopped in accordance with the steps carried out by the first and second nozzles 8, 9, the substrate supply device 11, the pressing rollers 5a, 5b and the ionizing radiation irradiating device 12.

Dies having the structure as shown in FIGS. 4 and 5 are prepared as the forming die 2. These dies are disposed in a line on the conveying device 13.

The temperature-adjusting device 10 is provided on the returning passage 13b, and preferably in a connection position of the returning passage 13b with the lifter 14a for lifting the forming die 2. The temperature-adjusting device 10, which is provided on the returning passage 13b, provides a system in which temperature of the forming die 2 has been properly adjusted before the forming die 2 enters the inlet of the traveling passage 13a. This makes it possible to make a temperature adjustment of the forming die 2 during its non-service period of time, i.e., when the forming die 2 does not contribute to the formation of the lens sheet, thus preventing the length of the conveying device 13 for the forming dies 2 from being lengthen unnecessarily. The temperature-adjusting device 10 has a chamber 10a for surrounding the forming die 2, which stops once returning on the returning passage 13b. Dried vapor, hot air 6 heated by an electric heater or the like is supplied into the chamber 10a. The hot air 6, which is blown from the bottom of the chamber onto the forming die 2 heats it to a suitable temperature for formation of the lens sheet. The forming die 2 is kept in a stand-by state on the returning passage 13b until it is received by the lifter 14a for lifting the forming die 2. The forming die 2 is heated to a suitable temperature during such a stand-by state.

Figure 7:
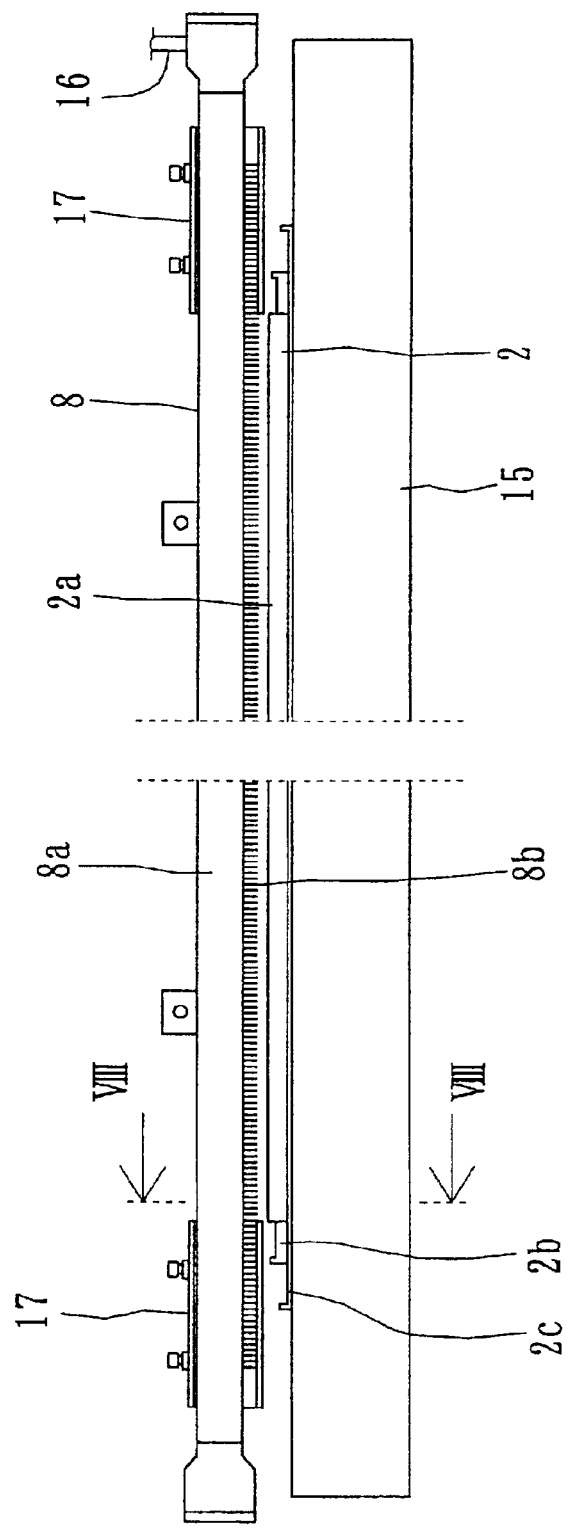
FIG. 7 is a descriptive view of the lens sheet manufacturing apparatus, having a viewing direction based on the line VII—VII in FIG. 6.
Figure 8:
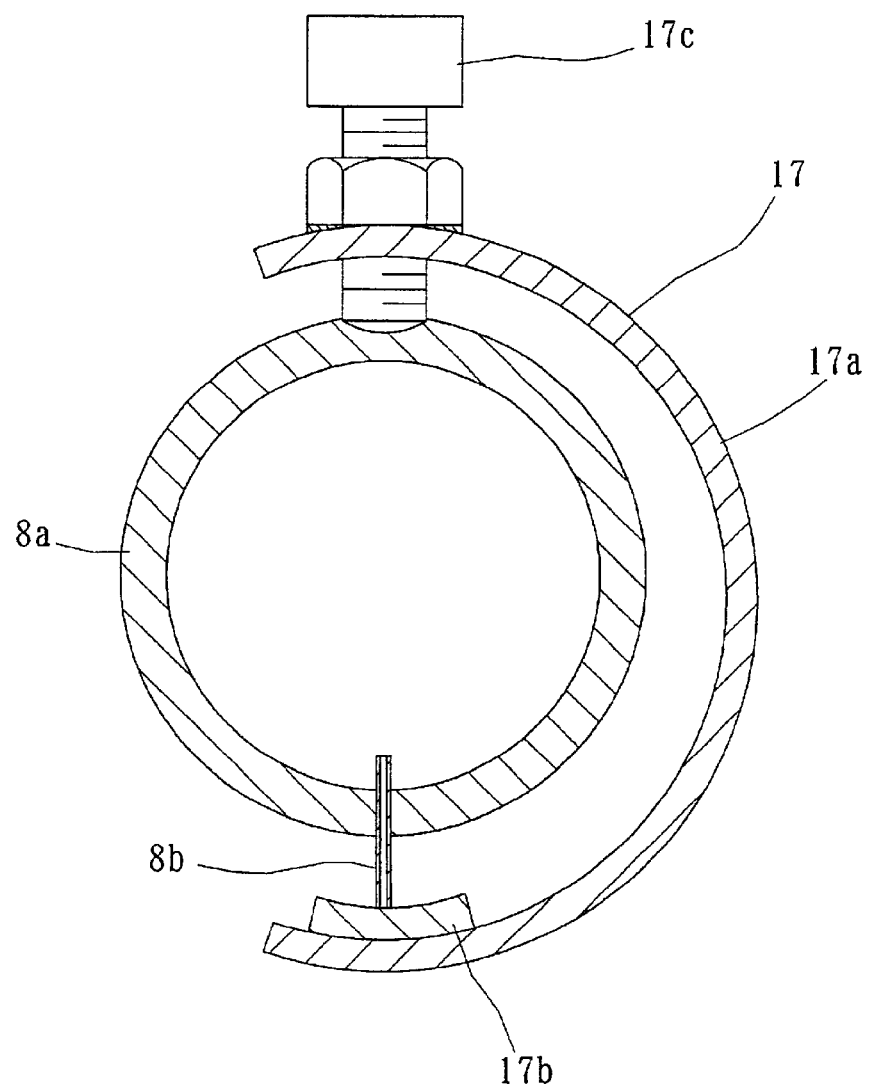
FIG. 8 is a cross-sectional view cut along the line VIII—VIII in FIG. 7.

The first nozzle 8 is disposed on the inlet of the traveling passage 13a of the conveying device 13. More specifically, there is used as the first nozzle 8 a multiple nozzle, which has a structure as shown in FIGS. 7 and 8. The reference numeral "15" in FIG. 7 denotes the conveyer roller of the traveling passage 13. The multiple nozzle 8 is provided with a main pipe 8a, which is disposed horizontally in the transverse direction of the traveling passage 13a, and with a plurality of nozzle pipes 8b, which are disposed at regular intervals on a single line on the lower surface of the main pipe 8a. The main pipe 8a has the opposite closed ends. A supply conduit 19 for supplying the ionizing radiation curing type liquid resin is connected to a prescribed portion of the main pipe 8a. The nozzle pipes are formed of an elongated small-diameter pipe made of stainless steel and pass through the wall of the main pipe 8a and are secured thereto by means of press fitting. The ionizing radiation curing type liquid resin 3 supplied into the main pipe 8a is poured simultaneously from the tip ends of the nozzle pipes 8b, which are disposed in a line, and applied onto the forming die 2, which travels below the nozzle pipes 8b or stops traveling.

There are normally prepared the plurality of forming dies 2 having the different dimensions in accordance with the size of the lens sheet 1 to be manufactured. There may however be prepared the first nozzle 8, which is used exclusively for the specific dimensions of the forming dies 2. Alternatively, a pair of adjusting devices 17 as shown in FIGS. 7 and 8 may be provided on the opposite sides of the main pine 8a so as to adjust an application width of the ionizing radiation curing type resin 3 in accordance with the width of the forming die 2. Each of the adjusting devices 17 includes a supporting plate 17a, which curves so as to partially surround the main pipe 8a, a closing plate 17b made of flexible material such as rubber, which is secured on the inner surface of the supporting plate 17a, and a set screw 17c for holding stationarily the supporting plate 17a on the main pipe 8a. The supporting plate 17a is fitted on the main pipe 8a so that the closing plate 17b comes into contact with the tip ends of the nozzle pipes 8b. In such a state, the setscrew 17c is tighten so that the tip end of the setscrew 17c is urged against the outer surface of the main pipe 8a. The supporting plate 17a is stationarily secured on the main pipe 8a so that the tip ends of the nozzle pipes 8b, which are located outside the forming die 2, are closed by the closing plate 17b, thereby adjusting an application width of the ionizing radiation cured type resin 3. Change in securing position of the adjusting device 17 on the main pipe 8a in an appropriate manner makes it possible to change the number of the nozzle pipes 8b, which are to be closed. However, there may previously be prepared the plurality of adjusting devices 17 having the different lengths to each other. In this case, selection of an appropriate one of these adjusting devices 17 makes it possible to change the number of the nozzle pipes 8b, which are to be closed, thereby adjusting an application width of the ionizing radiation cured type resin 3.

A single nozzle may be used in place of the multiple nozzle serving as the first nozzle 8. The single nozzle may be moved in a perpendicular direction to the traveling direction of the forming die 2 so that the ionizing radiation curing type resin is applied onto the forming die 2.

Figure 9:
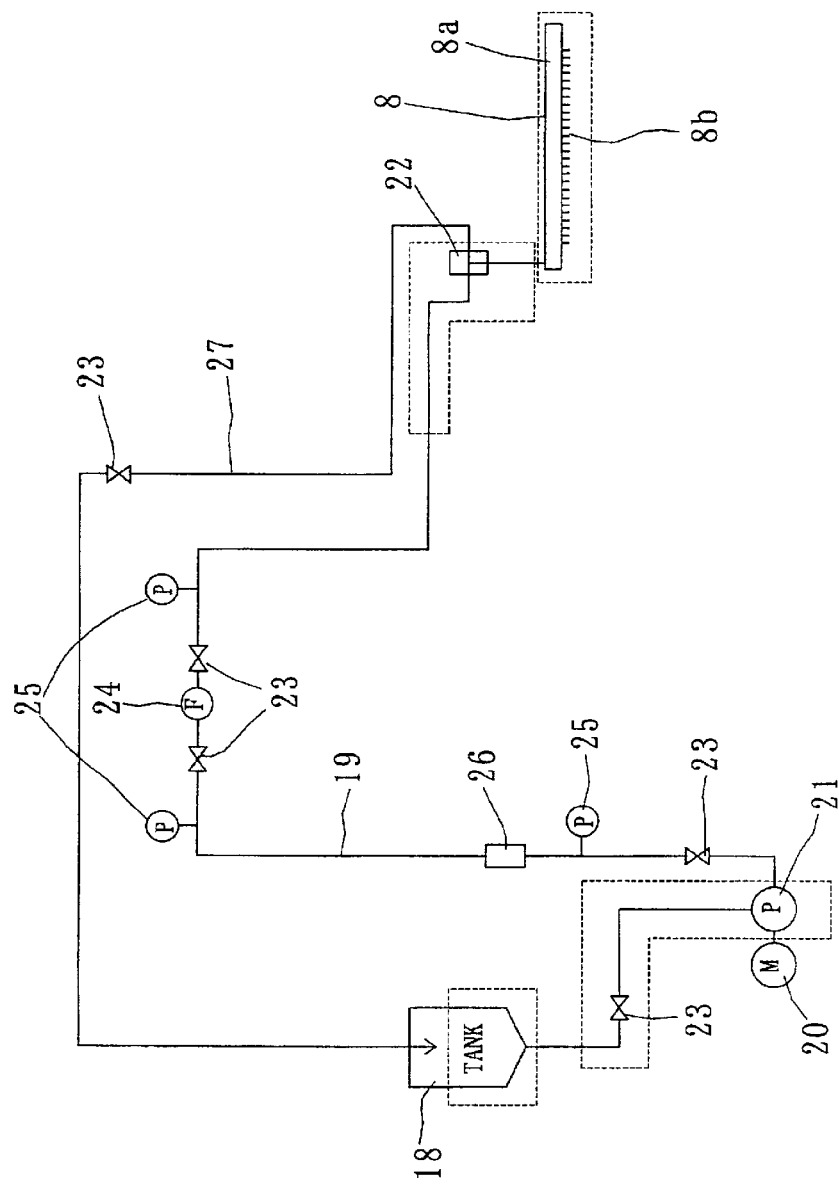
FIG. 9 is a view illustrating a piping system in a device for supplying ionizing radiation curing type resin.

Supply of the ionizing radiation curing type liquid resin 3 into the first nozzle 8 is conducted by a resin supply device as shown in FIG. 9. In FIG. 9, a reference numeral "18" denotes a reservoir tank 18 for the ionizing radiation curing type liquid resin 3. A supply conduit 19 for the ionizing radiation curing type liquid resin 3 extends from the reservoir tank 18 to the first nozzle 8. The supply conduit 19 is provided with a pump 21 driven by a gear motor 20, a discharge valve 22 serving as a three way valve for permitting connection of the source of the ionizing radiation curing type resin 3 with the first nozzle 8 to supply the resin 3 into the first nozzle or disconnection thereof, a manual valve 23, a filter 24, a pressure gauge 25, a flow meter 26 and the like. Driving of the pump 21 causes the ionizing radiation curing type resin 3 received in the reservoir tank 18 to flow in the supply conduit 19 toward the discharge valve 22. When the forming die 2 is moved in a prescribed position, the discharge valve 22 is opened so that the ionizing radiation curing type resin 3 flows into the main pipe 8a of the first nozzle 8. As a result, the ionizing radiation curing type resin 3 is poured onto the forming die 2. The resin supply device is provided with a circulation device. A return conduit 27 extends from the discharge valve 22 to the reservoir tank 18. In a state where the resin is not poured, the discharge valve 22 closes the supply conduit 19 communicating with the first nozzle 8 and simultaneously connects the supply conduit 19 to the return conduit 27. Accordingly, the ionizing radiation curing type resin flowing in the supply conduit 19 passes through the return conduit 27 and returns into the reservoir tank 18, thus performing circulation between the supply conduit 19 and the return conduit 27.

Figure 10:
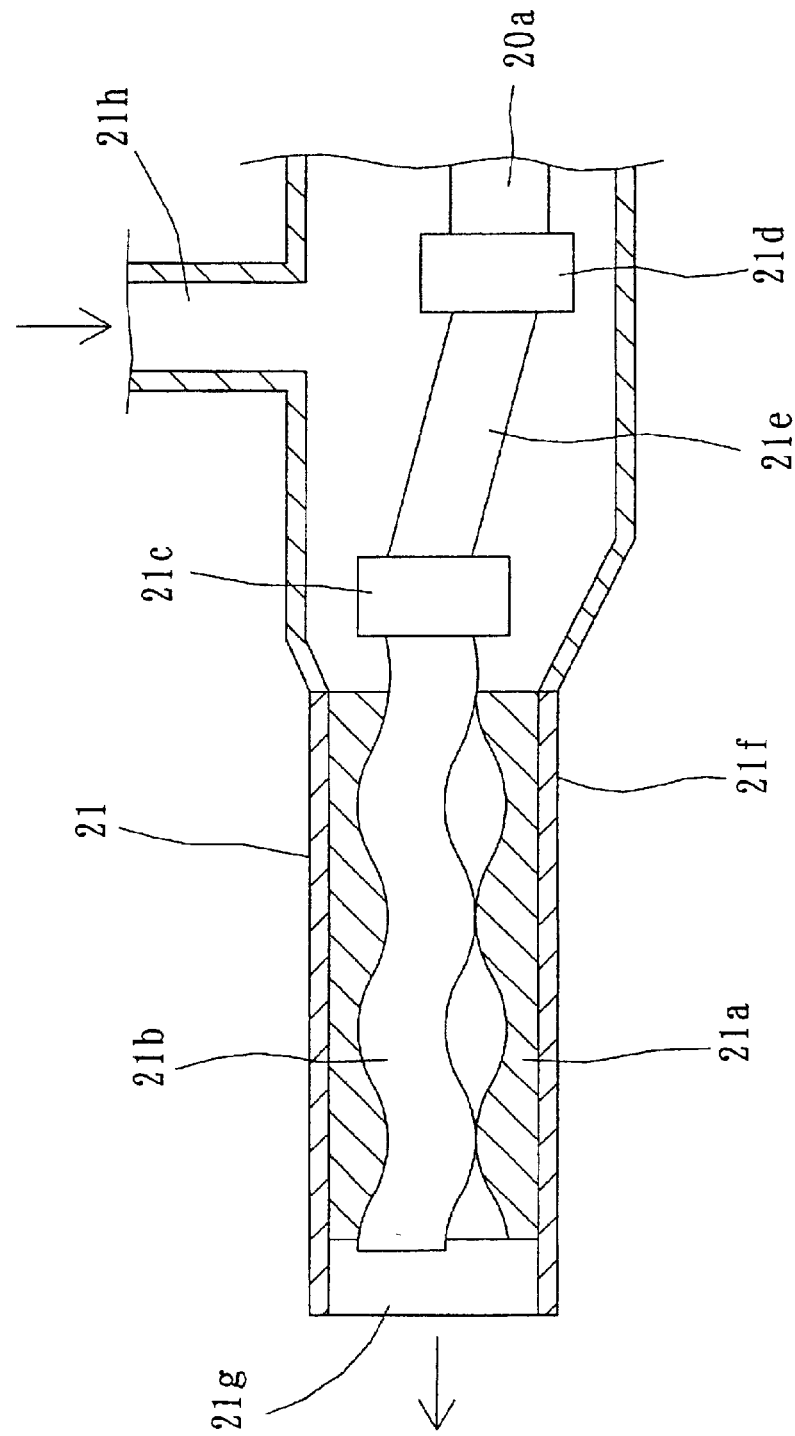
FIG. 10 is a cross-sectional view illustrating a pump in the device for supplying the ionizing radiation curing type resin.

A displacement type-single eccentric shaft screw pump as shown in FIG. 10, which is so called "snake pump", is used as the above-mentioned pump 21. The snake pump includes a stator 21a, which is made of resilient material and has a central through-hole with a elliptic cross section, a spiral-shaped rotor 21b inserted into the stator 21a, two universal joints 21c, 21d provided between the rotor 21b and an output shaft 20a of a gear motor 20, and a coupling rod 21e. A housing 21f of the pump 21 is provided at its portion in which the stator 21a is received, with a discharge port 21g connected with the supply conduit 19. The housing 21f is provided at its portion in which the universal joints and the other structural components are received, with a suction port 21h. The ionizing radiation curing type resin 3 received in the reservoir tank 18 is sucked from the suction port 21h into the stator 21a and supplied from the discharge port 21g to the discharge valve 22. Pulsation does not easily occur in such a snake pump. Accordingly, the ionizing radiation curing type resin 3 can be discharged at a constant flow rate from the nozzle pipes 8b. The ionizing radiation curing type resin 3 can be applied on the forming die 2 to form the layer having a uniform thickness. The snake pump imparts almost no shearing force to the ionizing radiation curing type resin 3, thus permitting to apply the resin onto the forming die 2 without deterioration of the resin.

The ionizing radiation curing type liquid resin 3, temperature of which has already been adjusted, is applied on the entirety of the upper surface of the forming die 2 by the first nozzle 8.

The second nozzle 9 is provided on the downstream side of the first nozzle 8 on the traveling passage of the conveying device 13. The second nozzle 9 may have the same structure as the first nozzle 8. Supply of the ionizing radiation curing type resin to the second nozzle 9 may be performed by causing the conduit of the piping for the ionizing radiation curing type resin supplied to the first nozzle 8 to branch off.

The ionizing radiation curing type liquid resin is applied on the pressing-starting side of the first uncured layer, which has been applied on the forming die 2, to form an uncured resin pool.

The second nozzle 9 may be omitted, as an occasion demands. In such a case, there may be adopted an application system in which the ionizing radiation curing type resin 3 is applied onto the forming die 2 by the first nozzle 8 to form the first uncured layer, and then the forming die 2 is moved backward, and finally the ionizing radiation curing type resin 3 is applied on the one side of the first uncured layer to form an uncured resin pool.

Portions of the supply device for the ionizing radiation curing type resin, which are defined by dotted lines in FIG. 9, are heated by heaters in the shape of ribbon. More specifically, heating the reservoir tank 18, the pump 21, the discharge valve 22 and the nozzle 8 in an appropriate manner cases the ionizing radiation curing type resin to be poured smoothly from the first and second nozzles 8, 9. In addition, subjecting the ionizing radiation curing type resin 3 and the forming die 2 to the respective temperature adjustments makes it possible to enhance formability of the ionizing radiation curing type resin 3.

Figure 11:
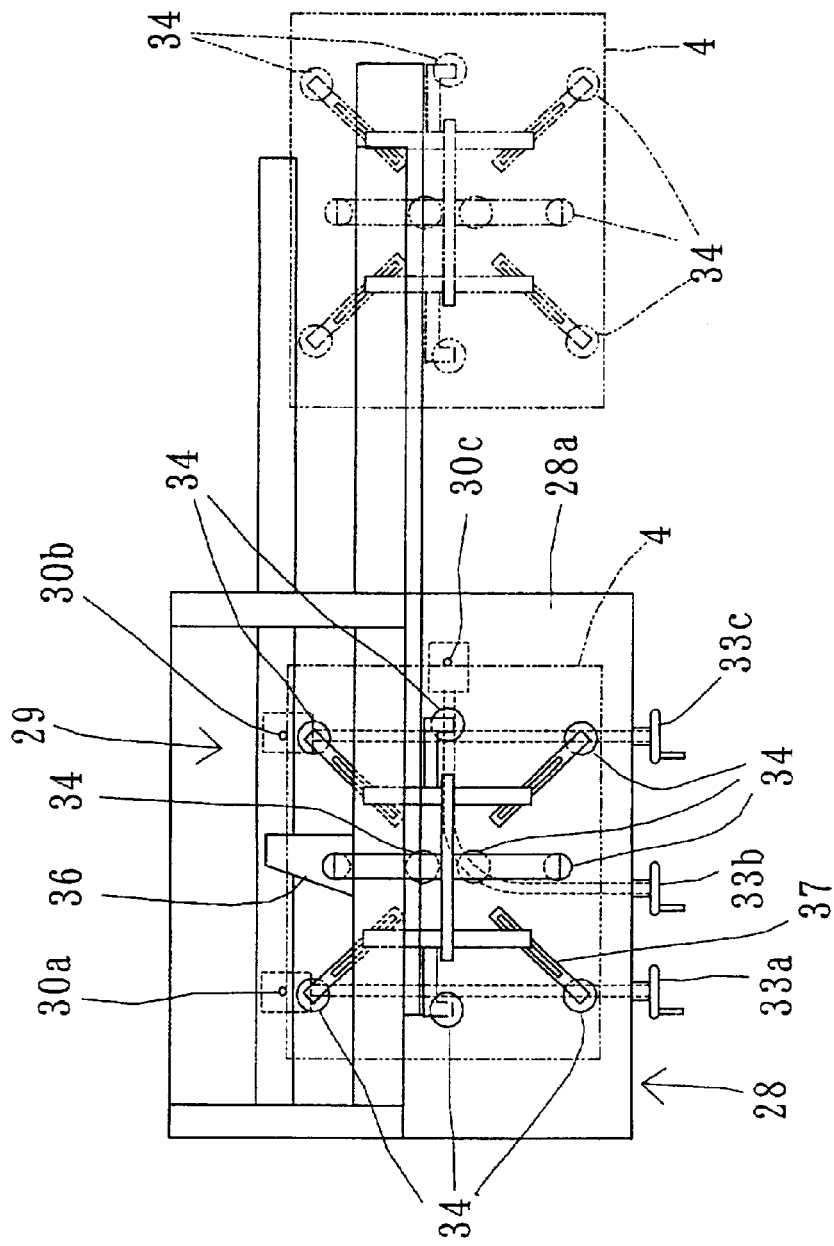
FIG. 11 is a plan view of a substrate supply device.
Figure 12:
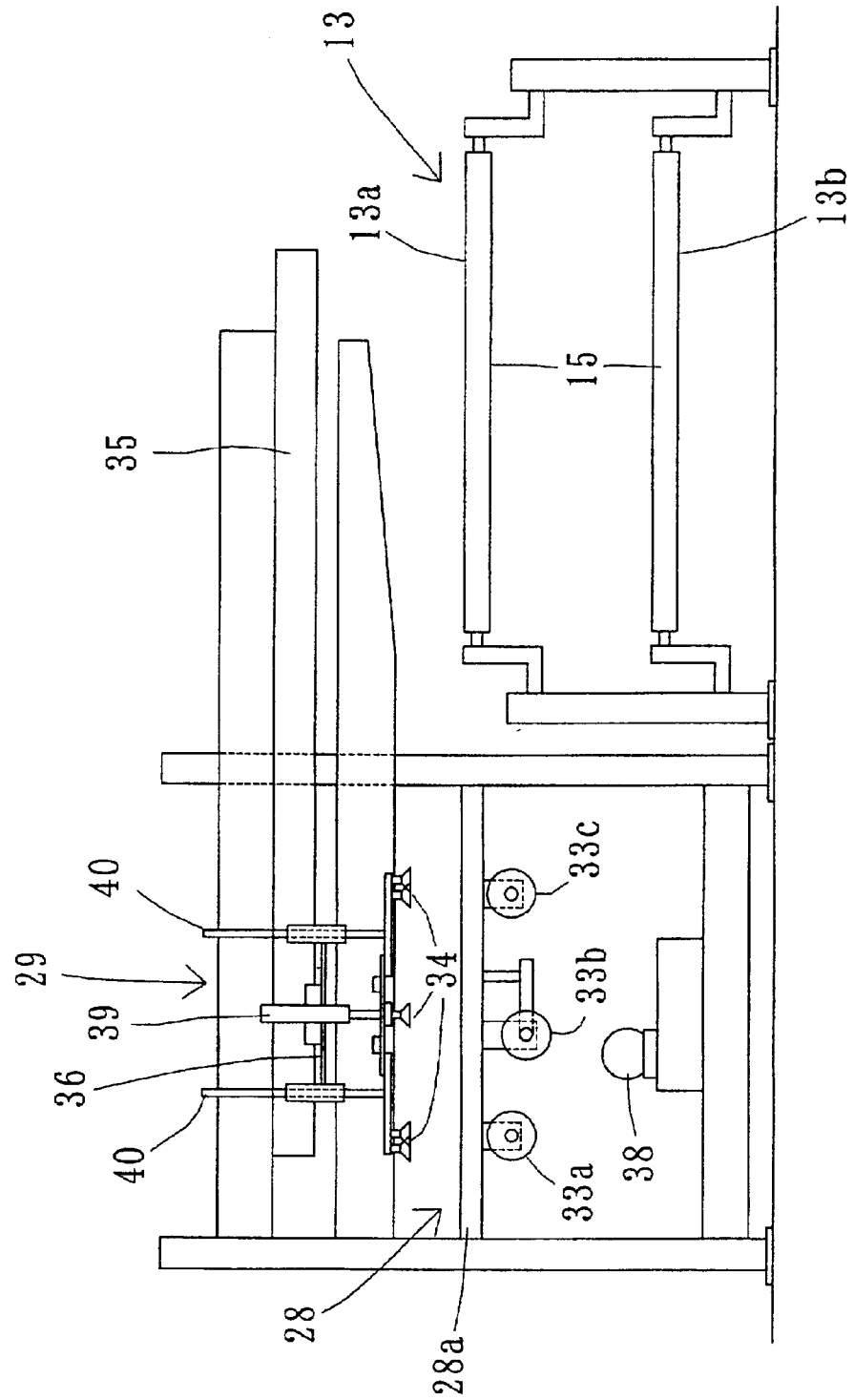
FIG. 12 is a front view of the substrate supply device, having a viewing direction based on the line XII—XII in FIG. 6.
Figure 13:
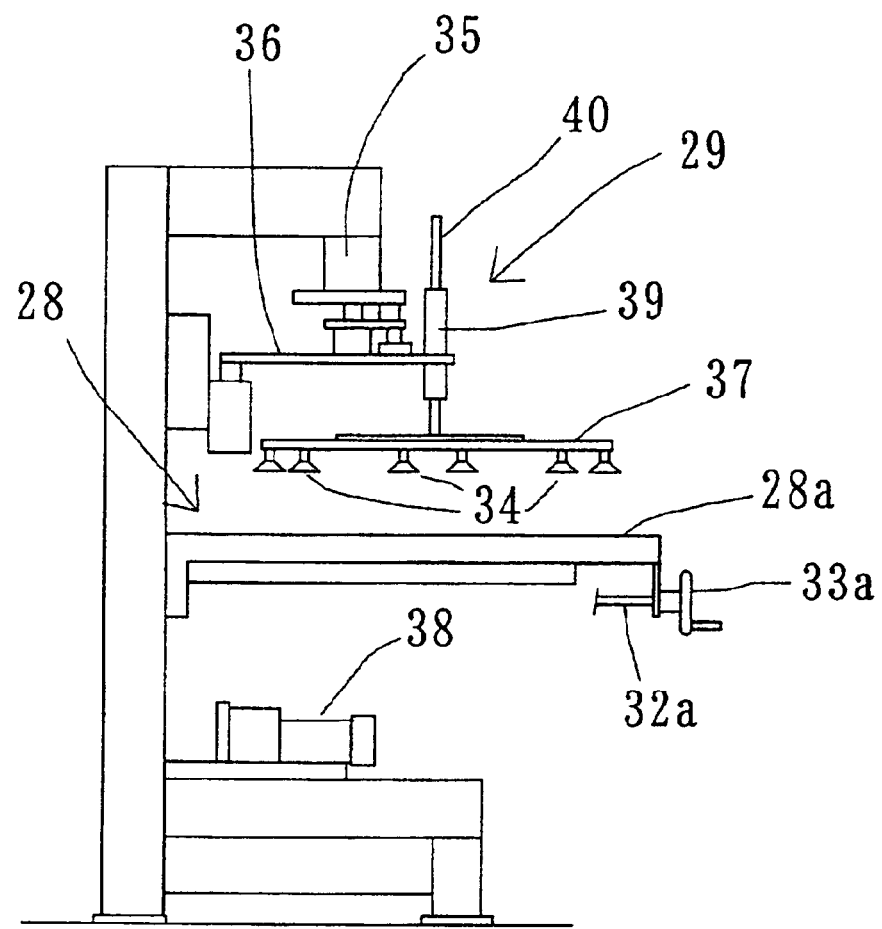
FIG. 13 is a left-hand side view of the substrate supply device.
Figure 15:
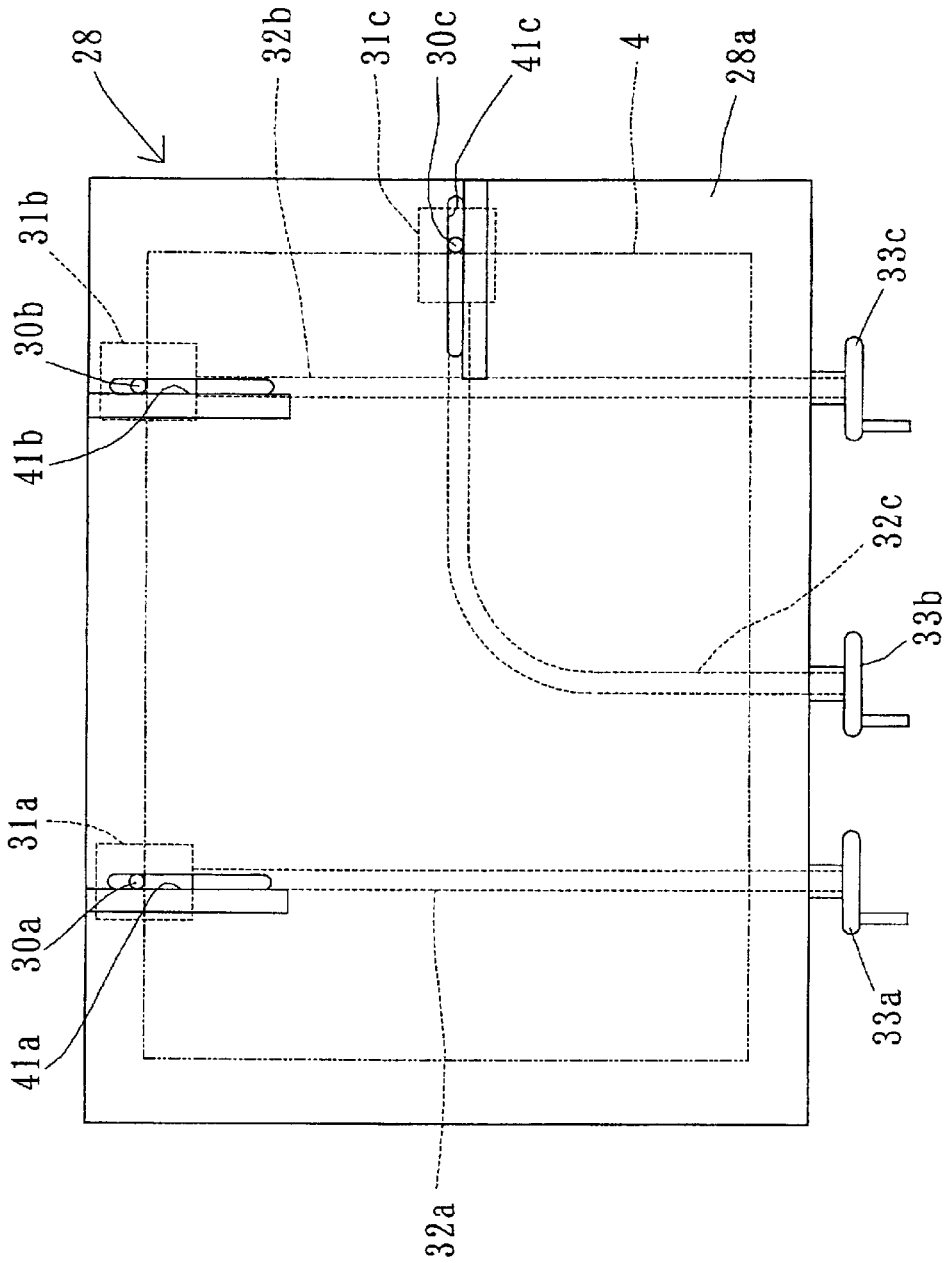
FIG. 15 is a plan view illustrating a positional determination table of the substrate supply device.

The substrate supply device 11 is provided on the downstream side of the second nozzle 9 on the traveling passage 13a of the conveying device 13. The substrate supply device 11 includes a table 28 for making a positional determination of the substrate 4 and a substrate-conveying device 29, which moves reciprocally between the table 28 and the forming die 2 on the traveling passage 13a, as shown in FIGS. 11 and 15.

The positional determination table 28 is disposed along the one side of the conveying device 13 so that the one side of the table 28 extends in parallel to the traveling direction of the forming die 2. The positional determination table 28 is provided with a top board 28a having a horizontal plane on which the substrate 4 is placed. Three pins 30a, 30b, 30c, which make a positional determination, project upward from the horizontal plane. Sliders 31a, 31b, 31c for respectively supporting the three pins 30a, 30b, 30c through air cylinders (not shown) are disposed below the top board 28a of the positional determination table 28. Of the three pins 30a, 30b, 30c, two pins 30a, 30b are disposed along one side of the top board 28a. The sliders 31a, 31b for respectively supporting these pins 30a, 30b are disposed within the positional determination table 28 so as to be slidable in the perpendicular direction to the above-mentioned one side of the top board 28a. The remaining pin 30c is disposed along the other side of the top board 28a, which is perpendicular to the above-mentioned one side thereof. The slider 31c for supporting the pin 30c is disposed in the positional within the positional determination table 28 so as to be slidable in the perpendicular direction to the above-mentioned other side of the top board 28a. The positional determination table 28 has slots 41a, 41b, 41c formed thereon, which extend in the sliding directions of the sliders 31a, 31b, 31c. The pins 30a, 30b, 30c pass through the slots 41a, 41b, 41c, respectively. The sliders 31a, 31b, 31c are engaged with tip end portions of screw shafts 32a, 32b, 32c, respectively, which are rotatably supported in the positional determination table 28. The screw shafts 32a, 32b, 32c are provided at their rear ends with handles 33a, 33b, 33c, respectively. The screw shaft 32c is provided at its middle portion with a flexible joint. Rotating the screw shafts 32a, 32b, 32c with the use of the handles 33a, 33b, 33c causes the sliders 31a, 31b, 31c to slide within the positional determination table 28 so that the pins 30a, 30b, 30c move along the slots 41a, 41b, 41c, respectively. The above-mentioned operations make it possible to change the positions of the pins 30a, 30b, 30c in accordance with the size of the substrate 4 and make a fine adjustment of positions of them. There may be a case where the pins 30*a*, 30*b*, 30*c* are not used due to the size of the substrate 4. In such a case, the pins 30*a*, 30*b*, 30*c* are moved down below the horizontal plane under the function of the air cylinders (not shown). The substrate 4 is placed on the positional determination table 28 one by one so that the adjacent two sides of the substrate 4 come into contact with the pins 30*a*, 30*b*, 30*c* to make a positional determination. In such a state, extending lines of a pair of opposite sides of the substrate 4 coincide with the vertical plane including a pair of opposite sides of the forming die 2, which stops traveling on the conveying device 13.

Figure 14:
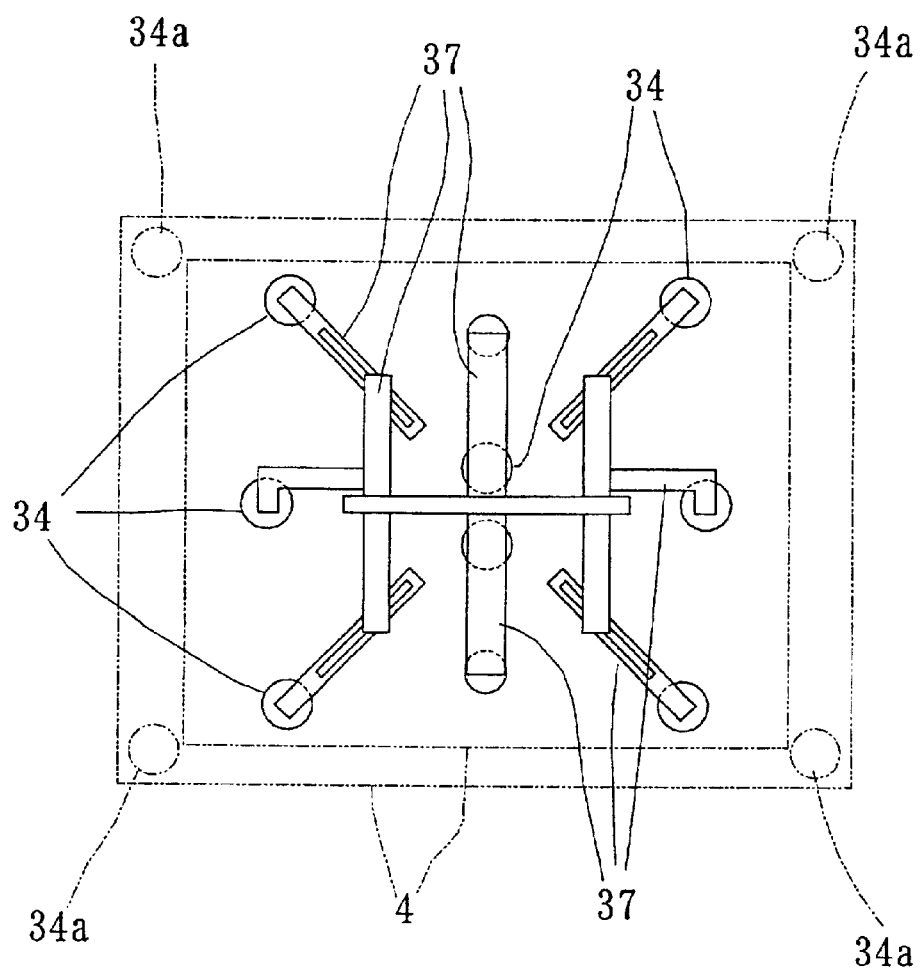
FIG. 14 is a plan view illustrating a suction member of the substrate supply device.

The substrate-conveying device 29 includes a substrate-suction member and a moving member. The substrate-suction member has on its horizontal plane a plurality of suction cups 34. The moving member reciprocally moves the substrate-suction member between the positional determination table 28 and the forming die 2 on the traveling passage 13*a* of the conveying device 13. The moving member includes a rail 35, which extends from a position above the positional determination table 28 to the other position above the traveling passage 13*a* of the conveying device 13 in a direction perpendicular to the traveling direction of the forming die 2, an arm 36, which is capable of traveling on the rail 35, and a driving unit for driving the arm 36 on the rail 35. The driving unit is composed of a linear motor, an air cylinder or the like. The substrate-suction member has a plurality of bar-shaped members 37, which are disposed on the horizontal plane and connected to each other, and a plurality of suction cups 34, which are secured to the bar-shaped members 37. The suction cups 34 are disposed in places, which correspond to the central portion of the substrate 4, and in places, which correspond to the peripheral portions of the substrate 4, as shown in FIG. 14. Additional suction cups 34*a* as shown in two-dot chain lines are provided so as to permit to suck a substrate 4 having a larger size, as an occasion demands. A switching operation is carried out to selectively connect one of the two sets of suction cups 34 and 34*a*, which are disposed along the different rectangular frame shapes, to a vacuum pump 38 in accordance with the size of the substrate to be sucked. The substrate-suction member is connected to the front end of the arm 36 through an air cylinder 39, which is disposed in a vertical direction, and a guide rod 40.

The substrate-suction member of the substrate-conveying device 29 moves up and down relative to the positional determination table 28 under operation of the air cylinder 39 so as to suck the substrate 4, which has been placed in a prescribed position on the positional determination table 28, and lift it up. The moving member of the substrate-conveying device 29 carries the substrate-suction member, by which the substrate 4 has been sucked, to a position just above the forming die 2, which temporarily stops traveling on the conveying device 13. Then, the air cylinder 38 is operated to move down the substrate-suction member toward the forming die 2 and then move it up. When the substrate-suction member descends toward the forming die 2, the suction of the substrate 4 is released so as to drop the substrate 4 onto the forming die 2. The substrate 4 is placed on the ionizing radiation curing type resin 3 applied on the forming die 2. Then, the substrate-suction member is carried again to the positional determination table 28 along the rail 35.

Figure 16:
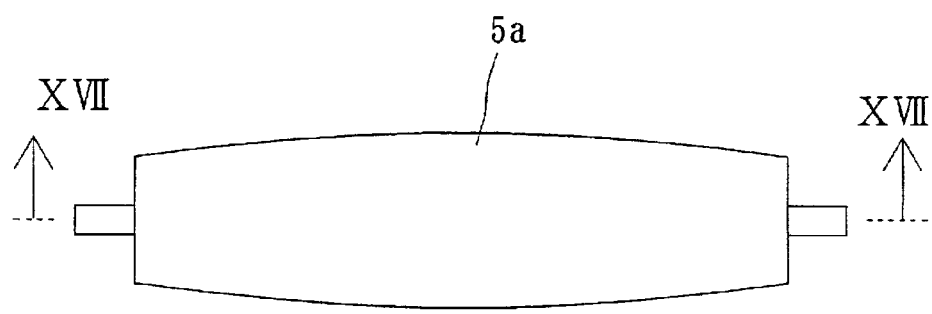
FIG. 16 is a front view of a pressing roller.
Figure 17:
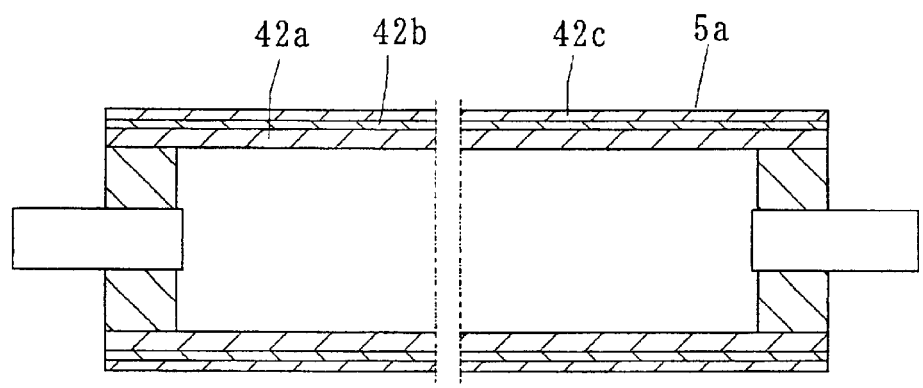
FIG. 17 is a cross-sectional view cut along the line XVII—XVII in FIG. 16.

The pressing rollers 5*a*, 5*b* are disposed on the downstream side of the substrate supply device 11 on the traveling passage 13*a* of the conveying device 13. The pressing rollers 5*a*, 5*b* are disposed so that the traveling passage 13*a* is placed between the pressing rollers 5*a*, 5*b* in the vertical direction. The lower roller 5*b*, which comes into contact with the lower surface of the forming die 2, is formed of metal into a cylindrical shape. The upper roller 5*a*, which comes into contact with the substrate 4, which has been placed on the forming die 2, is provided with a crown, as shown in FIG. 16. The upper roller 5*a* has a three-layer structure as shown in FIG. 17, which is composed of an innermost layer 42*a* formed of a cylindrical metallic pipe, an intermediate layer 42*b* made of rubber and an outermost layer 42*c* made of sponge. The outermost layer 42*c* made of sponge forms the above-mentioned crown. The intermediate layer made of rubber may be omitted. The upper roller 5*a* is moved up and down by means of an air cylinder (not shown).

When the forming die 2 travels on the traveling passage 13*a* of the conveying device 13, the upper roller 5*a* descends under the function of the air cylinder so that the front portions of the forming die 2 and the substrate 4 are held between the upper roller 5*a* and the lower roller 5*b*. Both the upper and lower rollers 5*a*, 5*b* roll to move the forming die 2 in one direction. Accordingly, the ionizing radiation curing type resin 3 is spread through the substrate 4 so as to be flattened.

The ionizing radiation irradiating device 12, which is composed of a ultraviolet lamp or the like, is disposed on the downstream side of the pressing rollers 5*a*, 5*b* on the traveling passage 13*a* of the conveying device 13. Ionizing radiation 7, which is irradiated on the ionizing radiation curing type resin 3 through the substrate 4 from the ionizing radiation irradiating device 12, cures the ionizing radiation curing type resin 3. When the forming die 2 is carried on the filter 14*b* and stands in a non-moving state, the ionizing radiation curing type resin 3, which has been cured by irradiation of the ionizing radiation 7, is peeled from the forming die 2 by a manual operation.

Now, description will be given below of a series of operations of the above-described apparatus for manufacturing lens sheets.

Driving the conveying device 13 circulates the forming dies 2 in the apparatus for manufacturing lens sheets.

The temperature-adjusting device 10 carries out temperature adjustment of the forming die 2, which is out of an actual formation of the lens sheet and temporarily stops traveling before the returning lifter 14*a*.

The first nozzle 8 applies the ionizing radiation curing type resin in the form of liquid on the entirety of the upper surface of the forming die 2, which has been subjected to the temperature adjustment, to form the first uncured resin layer on the inlet portion of the traveling passage 13*a* of the conveying device 13.

The ionizing radiation curing type resin 3, which circulates in the piping, is poured from the first valve 9, when the forming die 2 moves below the first nozzle 8 and the discharge valve 22 is opened. The forming die 2 travels at a constant speed below the first nozzle 8 so that the ionizing radiation curing type resin 3 is applied on the forming die 2 in a constant thickness.

The second nozzle 9 applies the ionizing radiation curing type resin 3 in the form of liquid on one side, i.e., the pressing-starting side of the first uncured layer formed on the forming die 2, on the downstream side of the first nozzle 8 to form an uncured resin pool on the first uncured layer. Application of the ionizing radiation curing type resin 3 through the second nozzle 9 is carried out after the operation of the traveling passage 13*a* of the conveying device 13 is temporarily stopped to keep the forming die 2 in a non-moving state.

The forming die 2 on which the first uncured layer and the uncured resin pool have been formed, is carried to a position of the substrate supply device 11 by the traveling passage 13a of the conveying device 13. The forming die 2 temporarily stops traveling immediately after it reaches to the above-mentioned position. The substrate-supply device 11 carries the substrate 4 above the forming die 2 and drops it thereon.

The position of the substrate 4 is previously determined on the positional determination table 28 so as to coincide with the position of the forming die 2.

After the substrate 4 is placed on the first uncured layer and the uncured resin pool of the ionizing radiation curing type resin 3, which have been applied on the forming die 2, the traveling passage 13a of the conveying device 13 carries the forming die 2 to the pressing rollers 5a, 5b. When the forming die 2 travels on the traveling passage 13a of the conveying device 13 to a prescribed position, the upper roller 5a descends so that the front portion, i.e., the pressing-starting end of the forming die 2 is held between the upper and lower rollers 5a, 5b. Both the upper and lower rollers 5a, 5b roll to move the forming die 2 in one direction. Accordingly, the uncured resin pool is spread on the first uncured layer through the substrate 4 to be flattened, thus forming the second uncured layer on the first resin layer. The first and second uncured layers are actually combined into a single united layer. The ionizing radiation curing type resin 3 flows so as to exclude air from a apace between the substrate 4 and the forming die 2, and finally a superfluous amount of resin flows outside of the die body 2a of the forming die 2. It is therefore possible to exclude bubbles from the entire region of the lens sheet to be manufactured.

The traveling passage 13a of the conveying device 13 carries the forming die 2, which has passed between the pressing rollers 5a, 5b, to the ionizing radiation irradiating device 12. The forming die 2 passes below the ionizing radiation irradiating device 12. The forming die 3 may temporarily stop traveling below the ionizing radiation irradiating device 12. The ionizing radiation irradiating device 12 irradiates ionizing radiation 7 on the first and second layers of the ionizing radiation curing type resin 3 through the substrate 4 to cure them.

The traveling passage 13a of the conveying device 13 carries the forming die 2 on the lifter 14b. When the forming die 2 is carried on the filter 14b and stands in a non-moving state, the ionizing radiation curing type resin 3, which has been cured by irradiation of the ionizing radiation 7, i.e., a lens sheet as a semi-finished product is peeled from the forming die 2 by a manual operation.

Then, the forming die 2 from which the semi-finished product has been removed, is returned to a position of the temperature-adjusting device 10 by the operation of the returning passage 13b. The forming die 2 is then subjected to the temperature adjustment through the temperature-adjusting device 10 and then returned again to the traveling passage 13a so that it can be used for the next formation of the lens sheet.

Second Embodiment

The lens sheet manufacturing apparatus of the second embodiment of the present invention has the similar structure to that of the first embodiment of the present invention. According to the second embodiment of the present invention, it is however possible to manufacture two kinds of lens sheets, which have the different sizes from each other, while traveling two kinds of forming dies having the different dimensions from each other on the same endless conveying device.

The lens sheet manufacturing apparatus has the fundamental structure, which is similar to that as shown in FIG. 6. However, formation conditions differ depending upon the size of the forming die 2. The formation conditions are therefore automatically changed in accordance with the kind of the forming die 2.

The formation conditions depending on the dimensions of forming die are as follows:

(1) for the first nozzle 8 in the first embodiment, for applying the ionizing radiation curing type resin 3 on the entirety of the upper surface of the forming die 2, an application width of the ionizing radiation curing type resin 3, an amount of resin poured, a pouring-starting position and a pouring-finishing position;

(2) for the second nozzle 9 in the first embodiment, an application width of the ionizing radiation curing type resin 3, an amount of resin poured and a pouring position;

(3) for the substrate supply device 11, the size of the substrate; and (4) pressing force of the pressing rollers 5a, 5b, a pressing-starting position and a pressing-finishing position.

Figure 18:
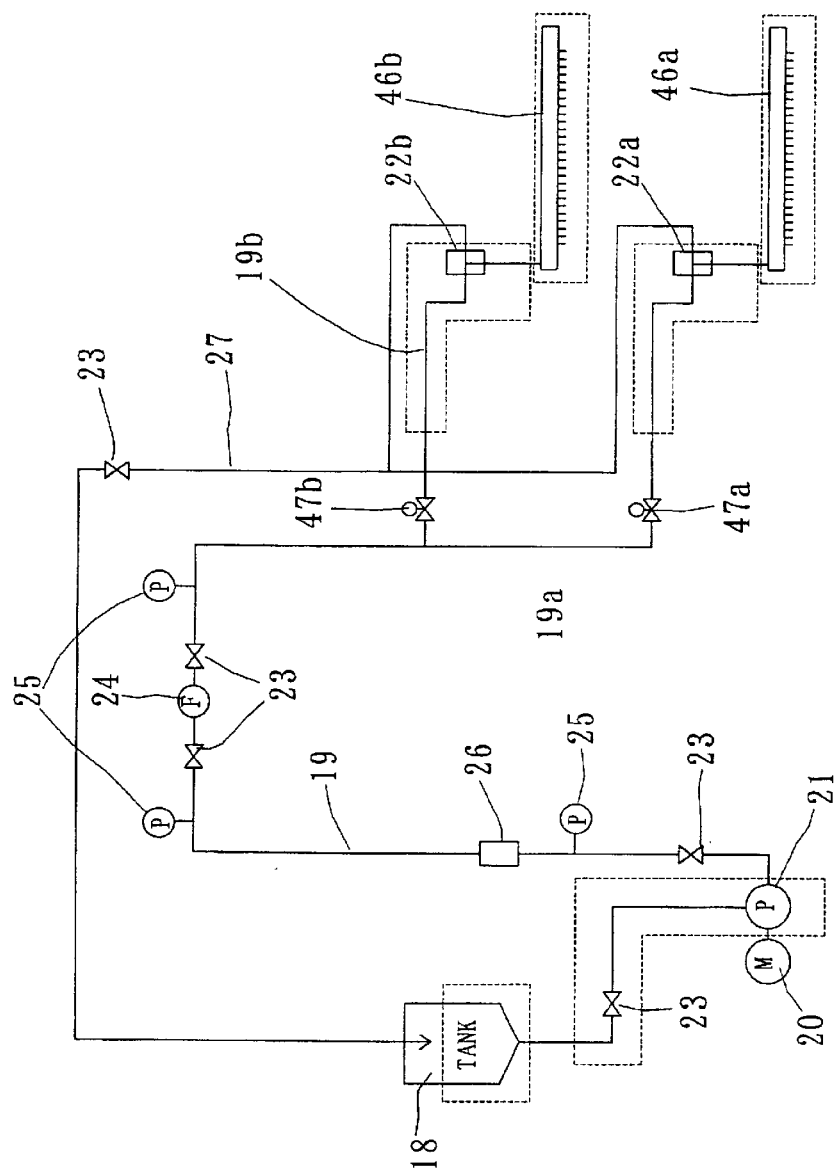
FIG. 18 is a view illustrating a piping system in a device for supplying ionizing radiation curing type resin in the second embodiment of the present invention.
Figure 19:
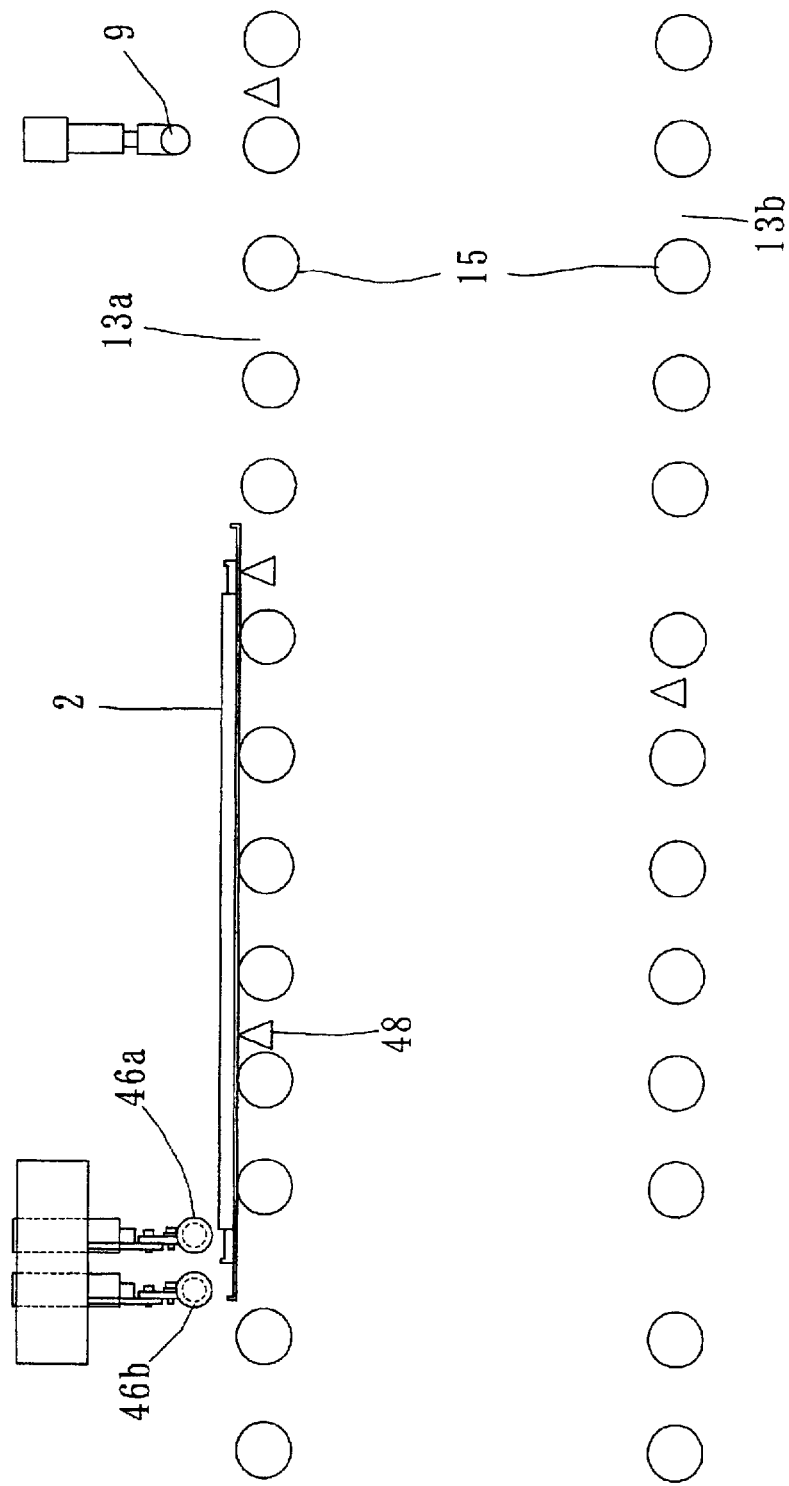
FIG. 19 is a view illustrating arrangements of nozzles in the second embodiment of the present invention.
Figure 20A:
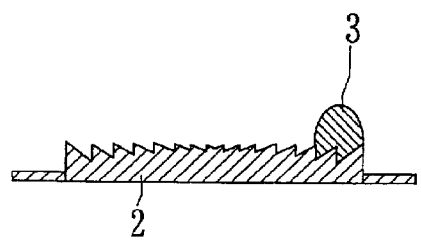
FIGS. 20(A) to 20(E) are descriptive views illustrating steps in sequence of a lens sheet manufacturing method of the third embodiment of the present invention.
Figure 20B:
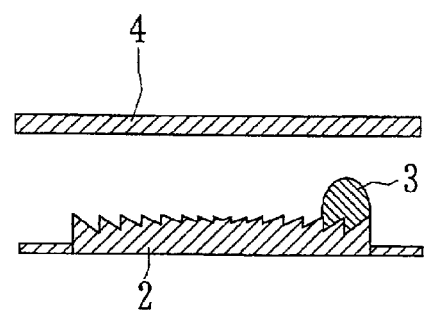
Figure 20C:
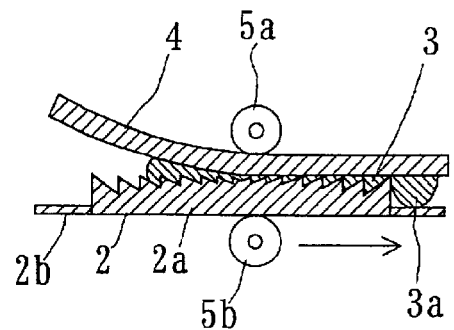
Figure 20D:
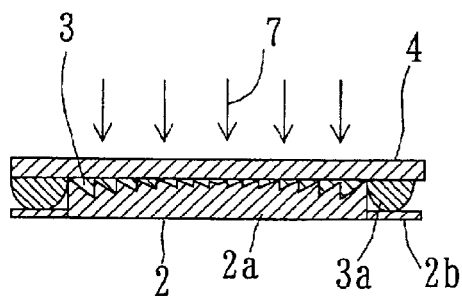
Figure 20E:
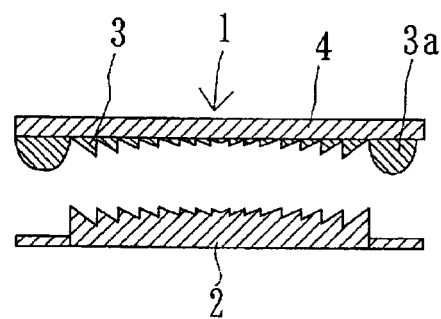
Figure 21A:
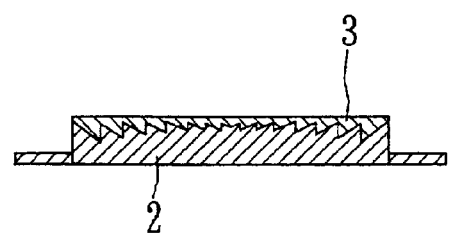
FIGS. 21(A) to 21(F) are descriptive views illustrating steps in sequence of a lens sheet manufacturing method of the fourth embodiment of the present invention.
Figure 21B:
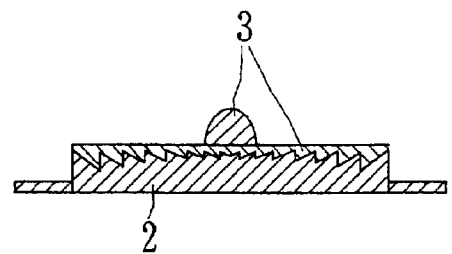
Figure 21C:
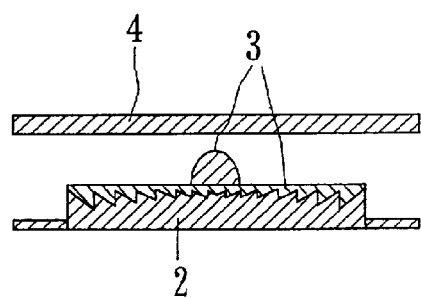
Figure 21D:
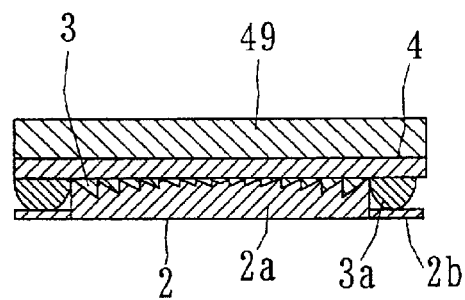
Figure 21E:
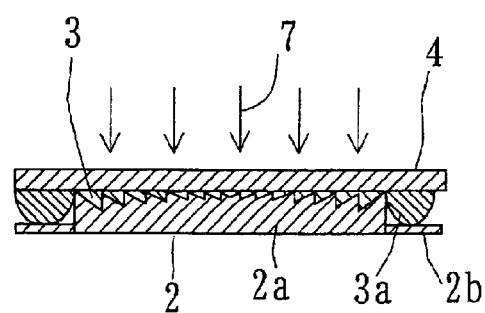
Figure 21F:
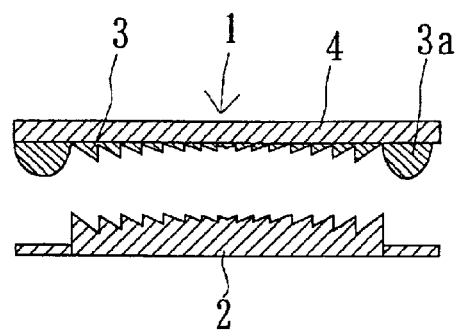

The application width listed in the items (1) and (2) above can be adjusted by arranging two kinds of first nozzle 46a, 46b on the traveling passage 13a of the conveying device 13 and providing the supply conduits 19a, 19b for supplying the ionizing radiation curing type resin 3 into the respective nozzles 46a, 46b with automatic valves 47a, 47b, respectively, as shown in FIGS. 18 and 19. The multiple nozzles 46a, 46b correspond to the respective forming dies 2 and portions of the nozzle pipes 8b, which are not to be used taking into consideration the width of the forming die 2, are closed by means of the adjusting device 17, as shown in FIGS. 7 and 8.

The amount of resin poured listed in the items (1) and (2) can be adjusted by changing number of revolutions of the pump 21.

The pouring-starting position, the pouring-finishing position and the pouring position listed in the items (1) and (2) above can be adjusted by carrying out a switching operation of a timer (not shown).

Change in size of the substrate 4 listed in the item (3) above can be made by carrying out a switching operation for moving up or down the pins 30a, 30b, 30c as shown in FIG. 15 and a switching operation for the sets of suction cups 34, 34a for sucking the substrate 4, as shown in FIG. 14.

The pressing force listed in the item (4) above can be adjusted by carrying out a switching operation of a pressure regulator (not shown).

The pressing-starting position and the pressing-finishing position listed in the item (4) can be adjusted by carrying out a switching operation of a timer (not shown).

Identification of two kinds of forming die 2 can be performed by a preset method or a sensing method. With respect to the sensing method, a metallic piece (not shown) is for example attached on the end surface of the base plate 2c of the forming die 2. Detecting existence of the metallic piece on the upstream side of the conveying device 13 with the use of a proximity sensor 48 performs identification of two kinds of forming die 2.

Detecting the existence of the metallic piece by means of the proximity sensor 48 causes one of the automatic valve 47a and 47b for the corresponding forming die to be opened and the other thereof to be closed so that the ionizing radiation curing type resin 3 is applied in an appropriate width through the corresponding multiple nozzle 46a or 46b.

The number of revolutions of the pump 21 is adjusted to an appropriate one so as to change the amount of resin poured in a proper manner. In addition, the switching operation of the timer (not shown) is carried out so as to change the pouring-starting position and the pouring-finishing position in an appropriate manner. The size of the substrate 4 varies depending upon the kind of the forming die 2. Accordingly, a switching operation for moving up or down the pins 30*a*, 30*b*, 30*c* is carried out and a switching operation for the sets of suction cups 34, 34*a* for sucking the substrate 4 is also carried out. The switching operation of the pressure regulator (not shown) is also carried out so as to change the pressing force given by the pressing rollers 5*a*, 5*b*. The switching operation of the timer (not shown) is also carried out so as to change the pressing-starting position and the pressing-finishing position of the pressing rollers 5*a*, 5*b*.

It is therefore possible to manufacture two kinds of lens sheet 1, which have different dimensions from each other, with the use of the same apparatus for manufacturing a lens sheet.

In the above-described embodiment, two kinds of forming die are used. The present invention may be applied to a case where three or more kinds of forming die are used.

Third Embodiment

The method of the third embodiment of the present invention for manufacturing a lens sheet comprises a resin-application step (A), a substrate supply step (B), a laminating step (C), a curing step (D) and a removing step (E) as shown in FIGS. 20(A) to 20(E). The resin-application step (A) is carried out to apply the ionizing radiation curing type resin 3 in the form of liquid on the upper surface of the forming die 2 for a lens sheet 1 to form an uncured resin pool. The substrate supply step (B) is carried out to place the substrate 4, through which ionizing radiation 7 permeates, on the uncured resin pool and the forming die 2. The laminating step (C) is carried out to press the substrate 4 and the forming die 2 from the pressing-starting side toward the pressing-finishing side by means of a pair of pressing rollers 5*a*, 5*b* so that the ionizing radiation curing type resin 3 is spread and flattened to reach the outside of the die body 2*a*. The curing step (D) is carried out to irradiate ionizing radiation 7 on the ionizing radiation curing type resin 3 through the substrate 4 to cure it. The removing step (E) is carried out to the ionizing radiation curing type resin 3 thus cured together with the substrate 4 from the forming die 2.

In the method for manufacturing a lens sheet of the third embodiment of the present invention, the resin-temperature adjusting step mentioned in the first embodiment is omitted. The resin-application step is carried out from the beginning. Needless to say, the resin-temperature adjusting step may be added. The resin-temperature adjusting step in the first embodiment of the present invention may be omitted.

The resin-application step (A), which is a partial-surface application step to apply the ionizing radiation curing type resin in the form of liquid on the upper surface of the forming die 2, forms an uncured resin pool along the pressing-starting side of the forming die 2. The formation of the uncured resin pool is conducted by pouring the ionizing radiation curing type liquid resin 3 on the forming die 2 by means of a single nozzle or a plurality of nozzles in the same manner as the first embodiment of the present invention.

The substrate supply step (B), which is to place the substrate 4 for the lens sheet 1 on the uncured resin pool and the forming die, is carried out, in the same manner as the first embodiment of the present invention, by sucking the sheet-shaped substrate 4 with the use of a plurality of suction cups, which are disposed on the horizontal plane, and then moving it above the forming die 2 on which the uncured resin pool 3 has been formed. The sucking action of the suction cups is released above the forming die 2 so that the substrate 4 drops on the uncured resin pool of the ionizing radiation curing type resin 3. The same substrate as that in the first embodiment is used.

The laminating step (C), which is to press the substrate 4 from the pressing-starting side toward the pressing-finishing side to flatten the uncured resin body to form a uncured resin layer below the substrate 4, is carried out by passing the forming die 2, on which the uncured resin pool has been formed and then the substrate 4 has been placed thereon, between a pair of pressing rollers 5*a*, 5*b* to spread and flatten the uncured resin pool in a prescribed uniform thickness. The uncured resin pool of the ionizing radiation curing type resin is forcedly pressed by means of the pressing rollers 5*a*, 5*b* from the pressing-starting side toward the pressing-finishing side to flow so as to exclude bubbles from a space between the substrate 4 and the forming die 2. Accordingly, an uncured resin layer is formed below the substrate 4. Finally, a superfluous amount of the ionizing radiation curing type resin 3 flows from the periphery of a die body of the forming die 2. It is therefore possible to exclude bubbles from the entire region of the lens sheet to be manufactured and prevent bubbles from being entrapped between the substrate and the forming die. Of the pair of pressing rollers 5*a*, 5*b*, the upper roller 5*a*, which comes into contact with the substrate 4, has the crown. The crown causes the ionizing radiation curing type resin 3 to flow smoothly, without entrapping bubbles into the lens formation grooves, which are concentrically formed.

The curing step (D), which is to irradiate ionizing radiation 7 such as ultraviolet ray or electron beam on the ionizing radiating curing type resin through the substrate 4, is carried out by disposing a radiation source such as an ultraviolet ray lamp above the forming die 2 and then irradiating the ionizing radiation 7 on the substrate 4. The ionizing radiation 7, which permeates the substrate 4, acts to the ionizing radiation curing type resin 3 to cure the resin layer. The ionizing radiation curing type resin 3 as cured adheres firmly to the substrate 4.

The removing step (E), which is to remove the resin layer as cured together with the substrate 4 from the forming die 2, is carried out in the same manner as the first embodiment.

A superfluous amount of ionizing radiation curing type resin 3*a* as cured adheres on the substrate 4 of the Fresnel lens sheet 1, which is peeled from the forming die 2. Useless end portions of the Fresnel lens sheet 1 are removed by a cutting operation in the same manner as the first embodiment.

Fourth Embodiment

The method of the fourth embodiment of the present invention for manufacturing a lens sheet comprises the first resin-application step (A), the second resin-application step (B), a substrate supply step (C), a laminating step (D), a curing step (E) and a removing step (F) as shown in FIGS. 21(A) to 21(F). The first resin-application step (i.e., the full-surface application step) (A) is carried out to apply the ionizing radiation curing type resin 3 in the form of liquid on the upper surface of the forming die 2 for a lens sheet 1 to form an uncured resin layer 3. The second resin-application step (i.e., the partial-surface application step) (B) is carried out to apply the ionizing radiation curing type resin 3 in the form of liquid on the central portion of the above-mentioned uncured resin layer 3 to form a uncured resin pool thereon. The substrate supply step (C) is carried out to place the substrate 4, through which ionizing radiation 7 permeates, on the uncured resin pool, the uncured resin layer and the forming die 2. The laminating step (D) is carried out to press the substrate 4 against the forming die 2 by means of a surface plate 49 so that the ionizing radiation curing type resin 3 is spread and flattened to reach the outside of the die body 2a. The curing step (E) is carried out to irradiate ionizing radiation 7 on the ionizing radiation curing type resin 3 through the substrate 4 to cure it. The removing step (F) is carried out to the ionizing radiation curing type resin 3 thus cured together with the substrate 4 from the forming die 2.

Also in the method for manufacturing a lens sheet of the fourth embodiment of the present invention, the resin-temperature adjusting step mentioned in the first embodiment is omitted. The resin-application step is carried out from the beginning. Needless to say, the resin-temperature adjusting step may be added as an occasion demands.

The first resin-application step (A), which is the full-surface application step to apply the ionizing radiation curing type resin in the form of liquid on the entirety of the upper surface of the forming die 2, forms the first uncured resin layer 3 on the upper surface of the forming die 2. The formation of the first uncured resin layer 3 is conducted by pouring the ionizing radiation curing type liquid resin 3 on the forming die 2 by means of a single nozzle or a plurality of nozzles in the same manner as the first embodiment of the present invention.

The second resin-application step (B), which is the partial-surface application step to apply the ionizing radiation curing type resin in the form of liquid on the central portion of the first uncured resin layer 3, which has been formed by the first resin-application step (A), forms an uncured resin pool on the central portion of the first uncured resin layer. Such an uncured resin pool is formed into a conical shape or an elongated block-shape on the central portion of the first uncured resin layer.

The above-mentioned first resin-application step (A) may be omitted and only the second resin-application step (B) may be carried out to form only the uncured resin pool.

The substrate supply step (C), which is to place the substrate 4 for the lens sheet 1 on the uncured resin pool, the first uncured resin layer and the forming die 2, is carried out in the same manner as the first embodiment of the present invention. As a result, the substrate 4 is placed on the uncured resin pool, the first uncured resin layer and the forming die 2. The same substrate as that in the first embodiment is used.

The laminating step (D), which is to press the substrate 4 toward the ionizing radiation curing type resin 3 and the forming die 2 to flatten the uncured resin pool to form the second uncured resin layer on the first uncured resin layer, is carried out by placing the forming die 2 on which the first uncured resin layer and the uncured resin pool have been formed and then the substrate has been placed on them, between a pair of surface plates 49 (there is not shown the lower surface plate, which may be substituted by the forming die 2) and pressing them in a prescribed uniform thickness. The uncured resin pool of the ionizing radiation curing type resin is forcedly pressed by means of the pressing rollers 5a, 5b from the central portion of the first uncured resin layer toward the periphery thereof to flow so as to exclude bubbles from a space between the substrate 4 and the forming die 2. Accordingly, the second uncured resin layer is formed between the first uncured resin layer and the substrate 4. Finally, a superfluous amount of the ionizing radiation curing type resin 3 flows from the periphery of a die body of the forming die 2. It is therefore possible to exclude bubbles from the entire region of the lens sheet to be manufactured and prevent bubbles from being entrapped between the substrate and the forming die.

The above-mentioned surface plates 49 may be substituted by the same pair of pressing rollers as those in the first embodiment. In such a case, the pressing rollers roll from the central portion of the forming die 2 toward one side of the forming die 2 to flatten the ionizing radiation curing type resin 3 between the substrate 4 and the forming die 2.

The descriptions of the curing step (E) and the removing step (F), which are carried out in the same manner as the first and third embodiments, are omitted.

In the first aspect of the present invention as described in detail, the method for manufacturing a lens sheet, comprises: a resin-application step for applying ionizing radiation curing type resin in a form of liquid on an upper surface of a forming die to form an uncured resin body on the upper surface of said forming die; a laminating step for placing a substrate on said uncured resin body and then pressing said substrate against said uncured resin body to flatten said uncured resin body, thereby forming a uncured resin layer, while spreading said uncured resin body to an outside periphery of said forming die; a curing step for irradiating ionizing radiation on said uncured resin layer through said substrate to cure said uncured resin layer, thereby forming a cured resin layer; and a removing step for removing said cured resin layer together with said substrate from said forming die. According to the above-mentioned features of the first aspect of the present invention, the ionizing radiation curing type resin, which is applied by the resin-application step is pressed and flattened through the substrate so that a superfluous amount of the ionizing radiation curing type resin flows from the periphery of a die body of the forming die. It is therefore possible to prevent bubbles from being entrapped between the substrate and the forming die.

In the second aspect of the present invention, said resin-application step may comprise a partial-surface application step for applying the ionizing radiation curing type resin on at least one part of the upper surface of the forming die to form a uncured resin pool thereon. According to such a feature, the uncured resin pool of the ionizing radiation curing type resin is flattened on the forming die so that the ionizing radiation curing type resin flows on the forming die, while excluding air from forming grooves of the forming die. It is therefore possible to prevent air from being entrapped into a lens sheet.

In the third aspect of the present invention, said resin-application step may comprise a full-surface application step for applying the ionizing radiation curing type resin on an entirety of the upper surface of said forming die to form a first uncured resin layer and a partial-surface application step for applying the ionizing radiation curing type resin on at least one part of said first uncured resin layer to form an uncured resin pool thereon. According to such a feature, the uncured resin pool of the ionizing radiation curing type resin as applied is flattened, while excluding air from the ionizing radiation curing type resin. It is therefore possible to supplement an insufficient amount of ionizing radiation curing type resin as first applied, while preventing air from being entrapped between the substrate and the forming die.

In the fourth aspect of the present invention, the pressing of said laminating step may comprise continuously pressing said substrate from said one side of the forming die to an other side thereof, said one side of the forming die serving as a pressing-starting side. According to such a feature, the ionizing radiation curing type resin is flattened, while pressing the substrate from the one side of the forming die to the other side thereof. It is therefore possible to place the substrate on the ionizing radiation curing type resin to provide a laminate structure, while excluding air from a space between the substrate and the forming die in one direction.

In the fifth aspect of the present invention, the pressing of said laminating step may comprise continuously pressing said substrate from a central portion of the forming die, said central portion of the forming die serving as a pressing-starting side. According to such a feature, the ionizing radiation curing type resin is flattened, while the substrate is pressed from the central portion of the forming die toward the periphery thereof. It is therefore possible to place the substrate on the ionizing radiation curing type resin to provide a laminate structure, while radially excluding air from a space between the substrate and the forming die. As a result, it is possible to exclude air in an appropriate manner upon manufacture of a lens sheet such as Fresnel lens having concentric circular grooves.

In the sixth aspect of the present invention, said partial application step may comprise applying the ionizing radiation curing type resin on said pressing-starting side. According to such a feature, the ionizing radiation curing type resin is pressed and flattened from the pressing-starting side toward the other side, i.e., a pressing-finishing side. It is therefore possible to effectively prevent bubbles from being entrapped between the substrate and the forming die.

In the seventh aspect of the present invention, the pressing of said laminating step may be carried out using a pressing roller. According to such a feature, the substrate is pressed by means of the pressing roller. It is therefore possible to gradually flatten the ionizing radiation curing type resin and exclude air from a space between the substrate and the forming die in an appropriate manner.

In the eighth aspect of the present invention, the pressing of said laminating step may be carried out using a surface plate. According to such a feature, the substrate is pressed by a flat surface of the surface plate. It is therefore possible to provide a uniform thickness of the ionizing radiation curing type resin layer, thus improving flatness of a lens sheet as manufactured.

In the ninth aspect of the present invention, the method may further comprise a die-temperature adjusting step for adjusting temperature of the forming die to a prescribed temperature, which is suitable to formation of a lens sheet, said die-temperature adjusting step being followed by said resin-application step. According to such a feature, the temperature of the forming die is adjusted to the prescribed temperature, which is suitable to formation of the lens sheet. It is therefore possible to ensure a smooth flow of the ionizing radiation curing type resin when flattening it so as to prevent properly bubbles from being entrapped into the resin. Adhesiveness of the ionizing radiation curing type resin to the substrate can also be improved.

In the tenth aspect of the present invention, said resin-application step, said laminating step, said curing step and said removing step may be carried out on a traveling passage of an endless conveying device for conveying the forming die, and said die-temperature adjusting step may be carried out on a returning passage of said endless conveying device. According to such a feature, it is possible to manufacture a lens sheet, while circulating the forming dies on the endless conveying device. In addition, the temperature of the forming die can be adjusted before it is returned to the starting position of the traveling passage. Consequently, manufacture of a lens sheet can be conducted without specifically providing any period of time for carrying out a die-temperature adjusting step.

In the eleventh aspect of the present invention, the method may further comprise a resin-temperature adjusting step for adjusting temperature of the ionizing radiation curing type resin to a prescribed temperature, which is suitable to formation of a lens sheet, said resin-temperature adjusting step being followed by said resin-application step. According to such a feature, it is possible to apply the ionizing radiation curing type resin having an appropriate temperature on the forming die. It is therefore possible to ensure a smooth flow of the ionizing radiation curing type resin on the forming die so as to prevent bubbles from being entrapped into the resin and improve formability of the lens sheet. In case where the temperature of the forming die is previously adjusted by the die-temperature adjusting step, it is possible to ensure a smoother flow of the ionizing radiation curing type resin on the forming die, thus preventing more effectively air from being entrapped into the resin. Adhesiveness of the ionizing radiation curing type resin to the substrate can also be improved.

In the twelfth aspect of the present invention, the apparatus of for manufacturing a lens sheet comprises: an application device for applying ionizing radiation curing type resin in a form of liquid on an upper surface of a forming die for a lens sheet to form an uncured resin body on the upper surface of said forming die; a substrate supply device for placing a substrate on said uncured resin body; a pressing device for pressing said substrate against said uncured resin body to flatten said uncured resin body, so as to form a uncured resin layer, while spreading said uncured resin body to an outside periphery of said forming die; and an irradiation device for irradiating ionizing radiation on said uncured resin layer through said substrate to cure said uncured resin layer. According to the above-mentioned features of the twelfth aspect of the present invention, the ionizing radiation curing type resin, which is applied by the resin-application device is pressed and flattened through the substrate, which is supplied by means of the substrate supply device so that a superfluous amount of the ionizing radiation curing type resin flows from the periphery of a die body of the forming die. It is therefore possible to prevent bubbles from being entrapped between the substrate and the forming die.

In the thirteenth aspect of the present invention, the apparatus may further comprise a die-temperature adjusting device for adjusting temperature of the forming die to a prescribed temperature, which is suitable to formation of a lens sheet. According to such a feature, the temperature of the forming die is adjusted to the prescribed temperature, which is suitable to formation of the lens sheet, by means of the die-temperature adjusting device. It is therefore possible to ensure a smooth flow of the ionizing radiation curing type resin so as to prevent properly bubbles from being entrapped into the resin. Adhesiveness of the ionizing radiation curing type resin to the substrate can also be improved.

In the fourteenth aspect of the present invention, said application device, said substrate supply device, said pressing device and said irradiation device may be disposed along a traveling passage of an endless conveying device for conveying the forming die, and said die-temperature adjusting device may be disposed along a returning passage of said endless conveying device. According to such a feature, it is possible to manufacture a lens sheet, while circulating the forming dies on the endless conveying device. In addition, the die-temperature adjusting device is disposed on the returning passage of the endless conveying device so that the temperature of the forming die can be adjusted before it is returned to the starting position of the traveling passage. Consequently, temperature adjustment of the forming die can be carried out utilizing a non-service period of time for the forming die. It is also possible to prevent the length of the conveying device from increasing.

In the fifteenth aspect of the present invention, the apparatus may further comprise a circulation device for circulating, when application of the ionizing radiation curing type resin by said application device is temporarily stopped, the ionizing radiation curing type resin, which is to be applied, while adjusting temperature thereof. According to such a feature, the ionizing radiation curing type resin, which has been subjected to the temperature adjusting step, is circulated. It is therefore possible to apply the ionizing radiation curing type resin, which always has an appropriate temperature, on the forming die by means of the application device, thus providing a smooth application of the ionizing radiation curing type resin on the forming die.

In the sixteenth aspect of the present invention, the apparatus may further comprise a displacement type-single eccentric shaft screw pump for supplying the ionizing radiation curing type resin to said application device. According to such a feature, the ionizing radiation curing type resin is supplied by means of the displacement type-single eccentric shaft screw pump. The pump supplies the ionizing radiation curing type resin to the application device without imparting shearing force to the ionizing radiation curing type resin. It is therefore possible to apply the ionizing radiation curing type resin onto the forming die without deterioration of the resin.

The entire disclosure of Japanese Patent Application No. 2001-273603 filed on Sep. 10, 2001 including the specification, claims, drawings and summary is incorporated herein by reference in its entirety.

What is claimed is:

1. An apparatus for manufacturing a lens sheet comprising;
   an application device for applying ionizing radiation curing type resin in a form of liquid on an upper surface of a forming die for a lens sheet to form an uncured resin body on the upper surface of said forming die;
   a substrate supply device for placing a substrate on said uncured resin body; a pressing device for pressing said substrate against said uncured resin body to flatten said uncured resin body, so as to form a uncured resin layer, while spreading said uncured resin body to an outside periphery of said forming die;
   an irradiation device for irradiating ionizing radiation on said uncured resin layer through said substrate to cure said uncured resin layer; and
   a circulation device for circulating the ionizing radiation curing type resin, when the application of the ionizing radiation curing type resin by said application device is temporarily stopped, while adjusting the temperature thereof.

2. The apparatus as claimed in claim 1, further comprising: a die-temperature adjusting device for adjusting temperature of the forming die to a prescribed temperature, which is suitable to formation of a lens sheet.

3. The apparatus as claimed in claim 2, wherein: said application device, said substrate supply device, said pressing device and said irradiation device are disposed along a traveling passage of an endless conveying device for conveying the forming die, and said die-temperature adjusting device is disposed along a returning passage of said endless conveying device.

4. The apparatus as claimed in any one of claims 1 to 3, further comprising: a displacement type-single eccentric shaft screw pump for supplying the ionizing radiation curing type resin to said application device.

\* \* \* \* \*